(12) United States Patent
Maydanik et al.

(10) Patent No.: US 10,601,793 B2
(45) Date of Patent: Mar. 24, 2020

(54) SYSTEMS AND METHODS FOR SECURING ELECTRONIC DATA WITH EMBEDDED SECURITY ENGINES

(71) Applicants: Boris Maydanik, University Park, MD (US); Michael Norton, Montclair, NJ (US)

(72) Inventors: Boris Maydanik, University Park, MD (US); Michael Norton, Montclair, NJ (US)

(73) Assignee: PSS, LLC, University Park, MD (US)

( * ) Notice: Subject to any disclaimer, the term of this patent is extended or adjusted under 35 U.S.C. 154(b) by 130 days.

(21) Appl. No.: 15/455,706

(22) Filed: Mar. 10, 2017

(65) Prior Publication Data

US 2017/0264596 A1    Sep. 14, 2017

Related U.S. Application Data

(60) Provisional application No. 62/307,233, filed on Mar. 11, 2016, provisional application No. 62/469,235, filed on Mar. 9, 2017.

(51) Int. Cl.
| | |
|---|---|
| *H04L 29/06* | (2006.01) |
| *G06F 21/60* | (2013.01) |
| *H04L 9/16* | (2006.01) |

(52) U.S. Cl.
CPC ........ *H04L 63/0435* (2013.01); *G06F 21/602* (2013.01); *H04L 9/16* (2013.01); *H04L 2463/041* (2013.01)

(58) Field of Classification Search
CPC .................................................. H04L 63/0435
USPC ................................................. 713/150–155
See application file for complete search history.

(56) References Cited

U.S. PATENT DOCUMENTS

| | | | | |
|---|---|---|---|---|
| 8,713,311 | B1* | 4/2014 | Roskind ............... | H04L 63/061 |
| | | | | 713/161 |
| 9,456,002 | B2* | 9/2016 | Kelson ................. | H04L 63/168 |
| 9,503,914 | B2* | 11/2016 | Ahmadi ............... | H04W 24/02 |
| 2008/0122663 | A1 | 5/2008 | Luo | |
| 2011/0107086 | A1 | 5/2011 | Soliman | |
| 2011/0129087 | A1 | 6/2011 | Zhang et al. | |
| 2011/0182419 | A1 | 7/2011 | Coomer | |
| 2012/0233471 | A1 | 9/2012 | Duhaime et al. | |
| 2012/0284528 | A1 | 11/2012 | Orovitz | |

(Continued)

OTHER PUBLICATIONS

International Search Report and Written Opinion for Application No. PCT/US2017/021827, dated Sep. 19, 2017 (12 pgs).

*Primary Examiner* — Lynn D Feild
*Assistant Examiner* — Viral S Lakhia
(74) *Attorney, Agent, or Firm* — Patterson Thuente Pederson, P.A.

(57) ABSTRACT

In an embodiment, an electronic data security system improves the security and usability of encrypted electronic data using a symmetric key approach implemented by security engines embedded on operably coupled integrated circuits. Engines paired to integrated circuits in combinations of hardware and software engines implementing security tasks can also be utilized. A first security engine is configured to interface to a second security engine and, using the components of the respective security engines, securely exchange electronic data using symmetric key encryption. The key change instruction configures the second security engine private key for a subsequent transmission.

18 Claims, 20 Drawing Sheets

(56) References Cited

U.S. PATENT DOCUMENTS

| | | | |
|---|---|---|---|
| 2013/0070925 A1* | 3/2013 | Yamada | H04L 9/08 |
| | | | 380/255 |
| 2014/0223182 A1* | 8/2014 | Avanzi | H04L 9/0838 |
| | | | 713/171 |
| 2015/0095648 A1* | 4/2015 | Nix | H04W 4/70 |
| | | | 713/170 |
| 2015/0143108 A1* | 5/2015 | Demeter | H04L 9/0891 |
| | | | 713/158 |
| 2015/0143125 A1* | 5/2015 | Nix | H04W 4/70 |
| | | | 713/171 |
| 2015/0312233 A1* | 10/2015 | Graham, III | H04L 9/006 |
| | | | 713/171 |
| 2015/0317466 A1* | 11/2015 | Kumar | G06F 21/32 |
| | | | 726/7 |
| 2015/0381657 A1* | 12/2015 | Kelson | H04L 63/168 |
| | | | 713/153 |
| 2016/0020782 A1* | 1/2016 | Ruff | G06F 17/2217 |
| | | | 341/95 |
| 2017/0034167 A1* | 2/2017 | Figueira | H04L 63/0428 |
| 2017/0214660 A1* | 7/2017 | Shah | H04L 63/0281 |
| 2017/0230355 A1* | 8/2017 | Su | H04L 63/0823 |
| 2017/0359175 A1* | 12/2017 | Tamura | G06F 21/6209 |
| 2018/0234233 A1* | 8/2018 | Knezevic | H04L 9/004 |
| 2018/0337782 A1* | 11/2018 | Wu | H04L 9/3268 |

* cited by examiner

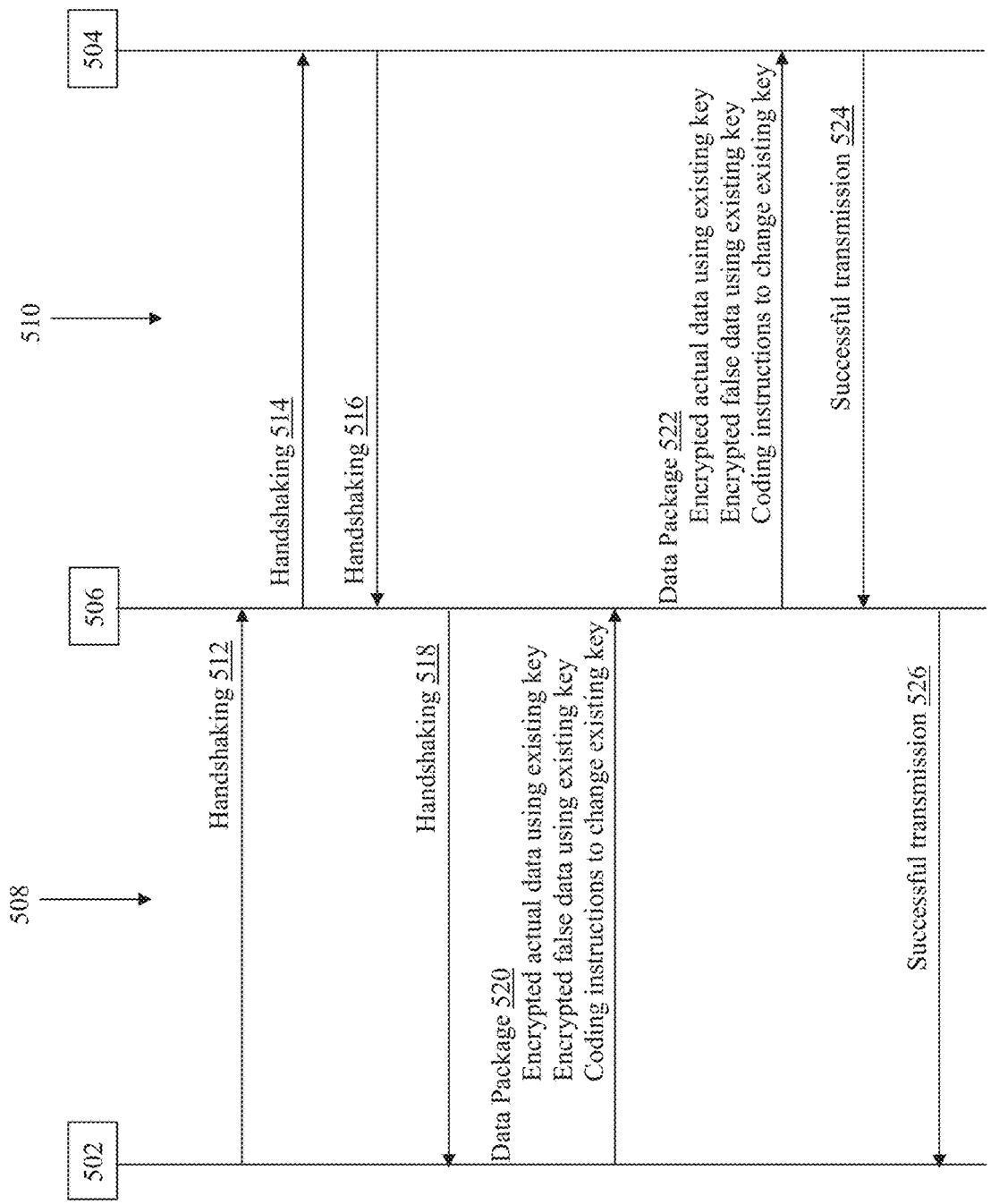

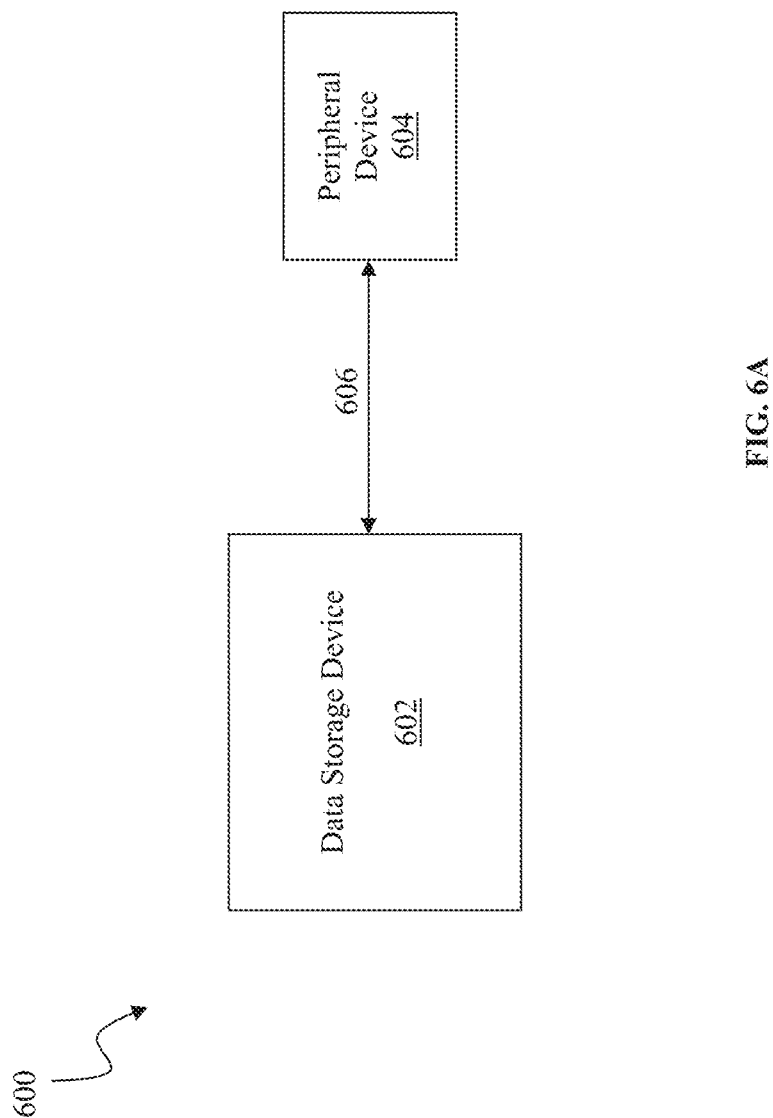

Secure Document Submission

Local Device Name: [DKET-V1.1-P2P-HS-LRG-A ▼]

Target Device Name: [DKET-V1.1-P2P-HS-LRG-B ▼]

☐ Store document in Target Device's Vault

File to upload: [C:\Apps\PSS\prototype\sample files\tree-pic.jpg] [Browse...]

[Press] to upload the file!

Sending Document

[Home]

Avenet Receiver Device B

Peer to Peer Embodiment

Click Here to View Transfered (Received) Files.

Click Here for DKET Document Request from Sender Device.

Click Here for Receiving Device Status.

Received Files

DarkTower.txt
tree-pic.jpg

[Delete All]

[Home]

tree-pic (3).jpg finished downloading.   [Open]   [Open folder]   [View downloads]   ✕

Secure Document Storage

Local Device Name: DKET-V1.1-DAR-HS-LRG-A

File to upload: C:\Apps\PSS\prototype\sample files\overview diagram  Browse...

[Press] to store the file!

[Home]

FIG. 11A

Secure Document Submission

Local Device Name: DKET-V1.1-P2P-HS-LRG-A

Target Device Name: DKET-V1.1-P2P-HS-LRG-B

☑ Store document in Target Device's Vault

File to upload: C:\Apps\PSS\prototype\sample files\bit-diagrams.pub  Browse...

[Press] to upload the file!

[Home]

FIG. 11B

SYSTEMS AND METHODS FOR SECURING ELECTRONIC DATA WITH EMBEDDED SECURITY ENGINES

RELATED APPLICATIONS

The present application claims the benefit of U.S. Provisional Application No. 62/307,233 filed Mar. 11, 2016, and U.S. Provisional Application No. 62/469,235 filed Mar. 9, 2017, both of which are hereby incorporated herein in their entirety by reference.

TECHNICAL FIELD

Embodiments relate generally to electronic data security, and more particularly, to systems and methods for securing electronic data using security engines.

BACKGROUND

Traditionally, electronic data security has been implemented using public key encryption. Public key encryption uses a pair of cryptographic keys, a public key known to everyone and a private or secret key known only to the recipient of the message. The public key and private key are related such that an encryption performed with one key can be decrypted only by the other member of the pair, and possession of one key does not enable the practical computation of the other. However, public key algorithms are computationally costly because of the need to generate large keys. Further, public key encryption is susceptible to a number of attacks, such as a brute-force key search attack and a man-in-the-middle attack.

Symmetric key cryptography is another encryption scheme utilized for electronic data security. In contrast to asymmetric key encryption, symmetric key encryption uses the same cryptographic key for both encryption and decryption. Symmetric key encryption is more computationally effective than asymmetric key encryption because of the lack of the need to generate large keys. Further, the symmetric Vernam cipher is the only encryption scheme that has been mathematically proved to be completely secure. However, symmetric key encryption such as the Vernam cipher requires that both parties have access to the same secret key, and key handling consequently becomes a security risk.

Therefore, there is a need for an encryption system that secures electronic data utilizing symmetric key encryption and which provides improved usability and security of shared secret keys.

SUMMARY

Embodiments substantially meet the aforementioned needs of the industry. In an embodiment, an electronic data security system improves the security and usability of encrypted electronic data using a symmetric key approach implemented by security engines embedded on operably coupled integrated circuits. In other embodiments, engines paired to integrated circuits in combinations of hardware and software engines implementing security tasks can be utilized. The electronic data security systems and methods described herein can be utilized to secure data in transit, such as communication transactions between electronic devices, or data at rest, such as data stored on a database or electronic device. Data security can therefore be enhanced in any number of industries that utilize encryption or secure data, including telecommunications, electronic commerce, banking, and the like, as well as governmental or national security-focused domains.

In an embodiment, an electronic data security system includes two or more integrated circuits each comprising a security engine embedded within the respective integrated circuit. The security engine of each integrated circuit comprises a device identifier, a unique, non-repeating random number generator, an encryption set, a decryption set, a unique, non-repeating false number generator, an intrusion detector, a key change instruction generator, and a code overwrite engine. In an embodiment, a first security engine is configured to interface to a second security engine and, using the components of the respective security engines, securely exchange electronic data using symmetric key encryption. In an embodiment, a security engine is incorporated directly into the processor or built as a separate chip entirely. All encryption and decryption work is completed in this engine, so that the primary processor is not slowed down by this function.

In an embodiment, a method for securing electronic data comprises providing a first security engine on a first integrated circuit, the first security engine including a first security engine private key; providing a second security engine on a second integrated circuit, the second security engine including a second security engine private key, wherein the second security engine is communicatively coupled to the first security engine; verifying a status of the first security engine private key and the second security engine private key during first integrated circuit and second integrated circuit handshaking; encrypting plaintext data on the first security engine; encrypting false data on the first security engine; packaging into a transmission package the encrypted plaintext data, the encrypted false data, and key change instructions describing how to change the private key for a subsequent data transmission; transmitting the transmission package from the first security engine to the second security engine; using the private key of the second security engine to decode the encrypted data; and changing the private key on the second security engine according to the key change instructions for a subsequent data transmission.

In an embodiment, a system for securing an electronic data transmission between a sending electronic device and a receiving electronic device comprises a sending electronic device including a processor, an operably coupled memory, and a communications engine interfaced with the processor; the memory further comprising instructions that, when executed, causes the sending electronic device to implement: selecting a first subset of codes from a codeset to generate a symmetric key, wherein the codeset is a collection of numbers, identifying a receiving electronic device configured to receive an electronic data transmission, handshaking with the receiving electronic device using the communications engine, wherein the handshaking includes transmitting the codeset and key change coding instructions from the sending electronic device to the receiving electronic device, encrypting a portion of the data using the first subset of codes and transmitting, using the communications engine, the encrypted portion of the data to the receiving electronic device, and changing the symmetric key for a subsequent transmission pass by selecting a second subset of codes from the codeset that is different from the first subset of codes using the key change coding instructions.

In an embodiment, a method for securing electronic data comprises providing a first security engine on a first integrated circuit, the first security engine including a first security engine private key; providing a second security engine on a second integrated circuit, the second security engine including a second security engine private key, wherein the second security engine is communicatively coupled to the first security engine; verifying a status of the first security engine private key and the second security engine private key during first integrated circuit and second integrated circuit handshaking; encrypting plaintext data on the first security engine; encrypting false data on the first security engine; packaging into a transmission package the encrypted plaintext data, the encrypted false data, and key change instructions describing how to change the private key for a subsequent data transmission; transmitting the transmission package from the first security engine to the second security engine; using the private key of the second security engine to decode the encrypted data; and changing the private key on the second security engine according to the key change instructions for a subsequent data transmission.

In another embodiment, a method for securing electronic data comprises providing a first security engine in a first software program, providing a second security engine in a second software program, verifying private key status of the first security engine and the second security engine during first device and second device handshaking, encrypting plaintext data on the first security engine, encrypting false data on the first security engine, packaging into a transmission package the encrypted plaintext data, the encrypted false data, and key change instructions describing how to change the private key for the subsequent data transmission, transmitting the transmission package to the second security engine, using the preexisting private key of the second security engine to decode the encrypted data, and changing the private key on the second security engine according to the key change instructions for subsequent data transmission.

In another embodiment, a method for securing electronic data comprises providing a first security engine in a combined hardware and software module, providing a second security engine in a second combined hardware and software module, verifying private key status of the first security engine and the second security engine during first device and second device handshaking, encrypting plaintext data on the first security engine, encrypting false data on the first security engine, packaging into a transmission package the encrypted plaintext data, the encrypted false data, and key change instructions describing how to change the private key for the subsequent data transmission, transmitting the transmission package to the second security engine, using the preexisting private key of the second security engine to decode the encrypted data, and changing the private key on the second security engine according to the key change instructions for subsequent data transmission.

In a feature and advantage of embodiments, security is enhanced by the use of symmetric key encryption. The symmetric key encryption scheme described herein has been proven to be completely secure and is not susceptible to the same types of attacks described above with respect to asymmetric encryption schemes. Security is also enhanced by frequency of key changes, using time to eliminate the opportunity to complete a successful attack, and by eliminating any redundancy of numbers in the transmission package, thereby removing any opportunity to use correlations as a basis for cryptanalysis.

In an encryption process, after the first use of a letter or symbol, each subsequent use is represented by a different encryption character and no character is reused, eliminating any possibility of correlation in the encryption process. This is accomplished by assigning multiple randomly generated characters to a register for each letter or symbol. As data is encrypted, the register is drawn down, thereby assigning to each subsequent use of a letter or symbol a new, unique character. When the registry of any letter or character is depleted, the encryption process stops and that portion of the data is transmitted or secured, along with the key change instruction, so that the next portion of the data will be encrypted with a new key. Through this method, the possibility of correlation within or between encrypted data segments is eliminated, preventing any possibility of cryptanalysis.

This symmetric key process is similar to the Vernam/One-Time-Pad (OTP) cipher. However, in order to overcome vulnerabilities caused by user errors and key management difficulties, embodiments are configured to change portions of the encryption/decryption key automatically and randomly with each transaction, effectively creating a new one-time key for each transaction. Further, all aspects of the encrypted data set are randomly generated and non-redundant, eliminating the possibility of cryptanalysis of the encrypted data. Additionally, frequency of key change transactions between paired chips or programs can be set randomly or at specific intervals, depending on use case requirements, thereby further increasing the security level of embodiments. When the subject data is successfully decrypted, the key changes for the next transaction overwrite the appropriate characters in the stored key, which is then used to encrypt the confirmation return, and the cycle is repeated.

In another feature and advantage of embodiments, efficiency is enhanced over asymmetric key encryption schemes. The symmetric key encryption scheme described herein is more computationally effective than asymmetric key encryption because of the lack of the need to generate large keys.

In another feature and advantage of embodiments, a security engine is installed or otherwise embedded during the manufacture of an integrated circuit or silicon chip. In such embodiments, security is enhanced over traditional systems because a shared secret key does not need to be transmitted to each of integrated circuits. In other embodiments, the security engine can be downloaded or otherwise programmed into existing integrated circuits or silicon chips (preferably using a secondary encryption scheme during transmission of the keys) to retrofit existing integrated circuits.

Options for repair of damaged devices may include the possibility post-manufacture replacement through direct physical replacement of modules or through firmware updates or even secured online replacement, depending on the degree of security required for a specific case. In an embodiment implemented with engines executing on specialized hardware, the initial keyset can be installed online, using a PKI method in order to enhance security.

In another feature and advantage of embodiments, in addition to the subject data, each encrypted data set also includes a series of random, non-repeating false information as an added security measure. These false characters appear randomly within the encrypted message, and are removed by the receiving system during decryption. Use of false characters is not essential to any embodiment, but can enhance security of particular embodiments.

In another feature and advantage of embodiments, systems and methods can be utilized to secure electronic devices utilizing a software-based solution implementing a dynamic key encryption as described herein. For example, a peer-to-peer secure transfer can be conducted from a sender device to a receiver device. In another example, a peer-to-peer secure transfer request can be made from a receiver device. In another example, local data at rest can be securely stored for any device, such as a sender device or a receiver device. In another example, a peer-to-peer secure transfer from a sender device to a secure vault on a receiver device (stored as data at rest) can be conducted. In another example, a secure transfer can be conducted from a sender device to a receiver device using an intermediate server. In another example, a peer-to-peer secure transfer can be conducted wherein the sender device and the receiver device obtain their initial keys from an intermediate server.

In a feature and advantage of an embodiment, systems and methods implement algorithms that prevent correlation in the encrypted data. When coupled with the changing of encryption codes with each transmission, these systems and methods prevent any possibility of cryptanalysis. In this embodiment cryptanalysis is prevented by the lack of any common characters in all transmissions relative to one complete message or transaction. Additionally, the codeset used for encrypting each transmission is changed for subsequent transmissions for that complete message or transaction.

In an embodiment, non-repeating unique codes are used in consecutive transmissions, but due to random generation, codes may be used in subsequent transmissions. Any repeated code usage is the result of random generation and will therefore result in no statistically valid correlation.

In an embodiment, due to the finite set of possible characters, codes can be repeated in subsequent communications or in the same communication on a different pass for a different character.

In an embodiment, therefore, the lack of any correlation or the absence of statistically significant correlation in the communication process prevents any possibility of cryptanalysis.

In another feature and advantage of embodiments, systems and methods can update the symmetric key at any interval. For example, depending on how compromised a system may be, it can be prudent to change the symmetric key with embodiments described herein once a month, once a week, or once a second.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 5B is a block diagram of a transmission sequence for the system of FIG. 5A, according to an embodiment.

FIG. 6A is a block diagram of a system for securing electronic data at rest utilizing a peripheral device, according to an embodiment.

FIG. 11A is a screenshot of a web application for executing data at rest secure storage for a direct-to-electronic device, according to an embodiment.

FIG. 11B is a screenshot of a web application for executing data at rest secure storage on a receiving device after a data transfer, according to an embodiment.

Figure 1:
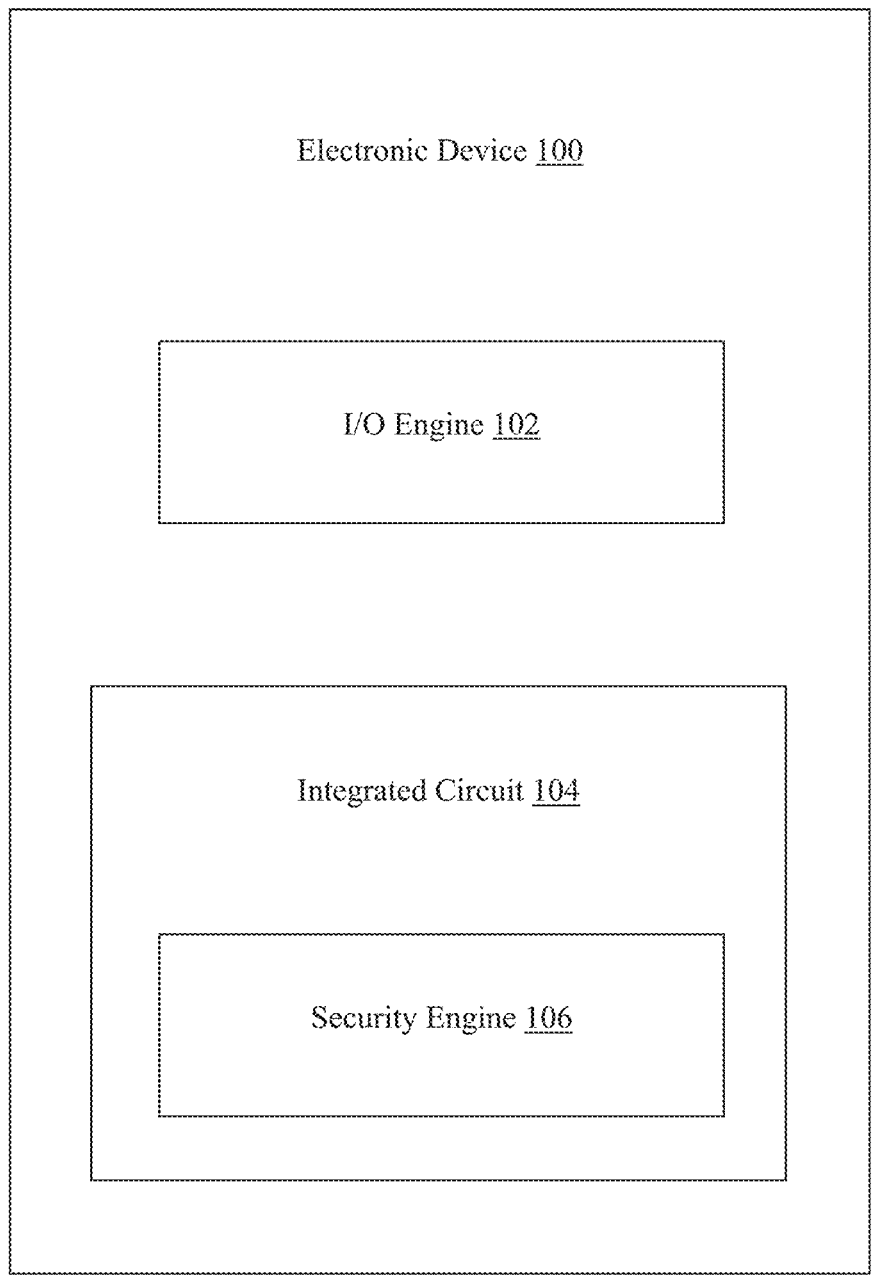
FIG. 1 is a block diagram of an electronic device including an integrated circuit configured with a security engine, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of an electronic device 100 is depicted, according to an embodiment. Electronic device 100 can comprise a desktop computer, laptop computer, smartphone, tablet, watch, or other suitable electronic device that may be connected to the Internet or other network. As such, electronic device 100 can be configured for various functions as directed by a user of the device. Electronic device 100 generally comprises an input/output (I/O) engine 102 and an integrated circuit 104 implementing a security engine 106.

The engines described herein can be constructed, programmed, configured, or otherwise adapted, to autonomously carry out a function or set of functions. The term engine as used throughout this document is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that cause the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. Accordingly, each engine can be realized in a variety of physically embodied configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly in parallel or series with, and/or complementary to other functions, or distributed differently among a set of engines than specifically illustrated in the examples herein.

In an embodiment, electronic device 100 comprises an I/O engine 102. I/O engine 102 can comprise any suitable hardware or software for interfacing to or communicating with external devices or electronic circuits. In FIG. 1, I/O engine 102 is shown as discrete from integrated circuit 104. However, one skilled in the art will readily appreciate that I/O engine 102 can be implemented on integrated circuit 104 similar to security engine 106.

Electronic device further includes an integrated circuit 104. Integrated circuit 104 can comprise a semiconductor wafer having any suitable number of resistors, capacitors, and transistors integrated into the wafer. For example, integrated circuit 104 can comprise a field-programmable gate array (FPGA) or application-specific integrated circuit (ASIC). In an embodiment, integrated circuit 104 comprises a silicon chip configured to store any number of engines.

Integrated circuit 104 includes an embedded security engine 106 configured for securing electronic data. In an embodiment, embedded security engine 106 comprises a set of engines or algorithms configured to carry out the symmetric key encryption described herein. In embodiments, security engine 106 is configured to interface to a second (outside) integrated circuit and second security engine via I/O engine 102. For example, the second integrated circuit and second security engine can be implemented on a second electronic device in communication with electronic device 100. Integrated circuit 104 can further be configured to implement the underlying functionality of electronic device 100 for which data is generated and is protected by security engine 106.

Figure 2:
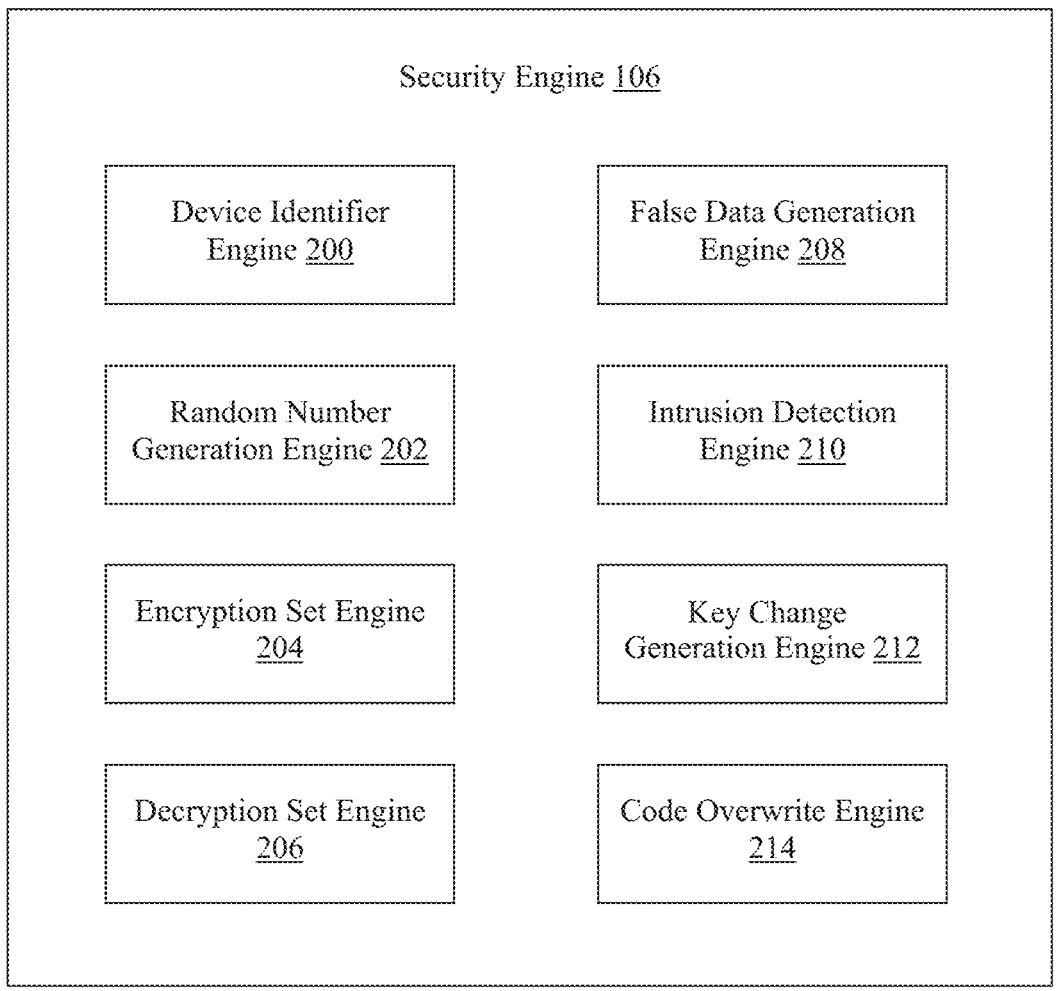
FIG. 2 is a block diagram of the security engine of FIG. 1, according to an embodiment.

Referring to FIG. 2, security engine 106 is further depicted in a block diagram. Security engine 106 generally comprises a device identifier engine 200, a random number generation engine 202, an encryption set engine 204, a decryption set engine 206, a false data generation engine 208, an intrusion detection engine 210, a key change instructions generation engine 212, and a code overwrite engine 214.

Device identifier engine 200 is configured to generate or determine a unique device identification for electronic device 100. For example, the unique device identification can comprise a hardware address exclusive to electronic device 100. In embodiments, device identifier engine 200 is configured to provide the device identification to any of the other engines of security engine 106. In other embodiments, device identifier engine 200 can provide the device identification to external devices. The device identification can be used at initial handshaking to confirm ID validity. In an embodiment, device identifier engine 200 includes a device ID confirmation and can trigger, if the use case requires, a random number of key change cycles to confirm key status between devices.

Random number generation engine 202 is configured to generate a random number for use in encryption set engine 204 and/or decryption set engine 206, and particularly, for seed key generation. In further embodiments, instructions from key change instructions generation engine 212 can instruct or direct random number generation engine 202 (for example, with a particular seed). In an embodiment, random number generation engine 202 can comprise a hardware-based random number generator (RNG). In another embodiment, random number generation engine 202 can comprise a software-based Pseudo-Random Number Generator (PRNG). In other embodiments, random number generation engine 202 can comprise aspects of both RNG and PRNG generators.

Encryption set engine 204 is configured to encrypt plaintext. For example, encryption set engine 204 can receive plaintext, perform an encryption on the plaintext by applying an appropriate encryption algorithm, and output encrypted text. In an embodiment, encryption set engine 204 utilizes a symmetric key shared with another security engine. In embodiments, the random number generated by random number generation engine 202 is utilized during encryption by encryption set engine 204.

For context, according to an embodiment, security engine 106 utilizes encryption set engine 204 to add metadata (instructions for key change and false data locations) to a message. Encryption is then conducted by encryption set engine 204 using the current shared key. Key change instructions and false information are inserted into the message, and the message is sent.

Decryption set engine 206 is configured to decrypt encrypted text. For example, decryption set engine 206 can receive encrypted text, perform a decryption of the encrypted text by applying an appropriate decryption algorithm, and output plaintext. In an embodiment, decryption set engine 206 utilizes a symmetric key shared with another security engine.

For context, according to an embodiment, security engine 106 utilizes decryption set engine 206 to receive a message. The received message is then decrypted using the current shared key. False information is removed from the message. The shared key is overwritten with the key changes, as described herein. Subsequently, the message is confirmed or an error is identified.

False data generation engine 208 is configured to generate false data. In an embodiment, false data generation engine 208 comprises a random number generator configured to generate "false" data as random numbers. For example, false data generation engine 208 can generate a random number used to seed false key information. In embodiments, the data generated by false data generation engine 208 is included in the transmission package from security engine 106. Embodiments can include multiple bogus data elements in the transmission package or transmission matrix. False data can further "hide" the "real" data by its inclusion and incorporation with the "real" plaintext data.

Intrusion detection engine 210 is configured to detect an intrusion during the transmission of encrypted text from another security engine 106. One skilled in the art will appreciate that any number of intrusion detection schemes can be utilized, including statistical anomaly-based detection or signature-based detection. In an embodiment, intrusion detection engine 210 continuously watches for hacking attempts or missing information.

Key change instructions generation engine 212 is configured to generate key change instructions for encryption set engine 204 and/or decryption set engine 206 for subsequent transmissions. In embodiments, key change instructions generation engine 212 comprises instructions to change the existing encryption set to a subsequent encryption set, and instructions to change the existing decryption set to a subsequent decryption set. In particular, key change instructions generation engine 212 generates the partial key to be used for the next encryption/decryption cycle. More particularly, the key change instructions comprise instructions for how to change the shared private key for the next round of transmission. Key change instructions generated by key change instructions generation engine 212 are communicated to a corresponding security engine 106 so the communicating pair of security engines match in symmetric keys used for encryption and decryption.

In an embodiment, key change instructions can indicate the number, value, and locations of the key bits to be changed. For example, if the initial key has ten bits, the instructions might indicate three bits will change in accord with newly stated values and their locations in the key will be the third, eighth and ninth positions.

Code overwrite engine 214 is configured to overwrite or replace portions of the code of security engine 106 according to instructions from key change instructions generation engine 212. In an embodiment, code overwrite engine 214 can command integrated circuit 104 to erase and rewrite portions of security engine 106, such as encryption set engine 204, decryption set engine 206, or key change instructions generation engine 212.

Figure 3:
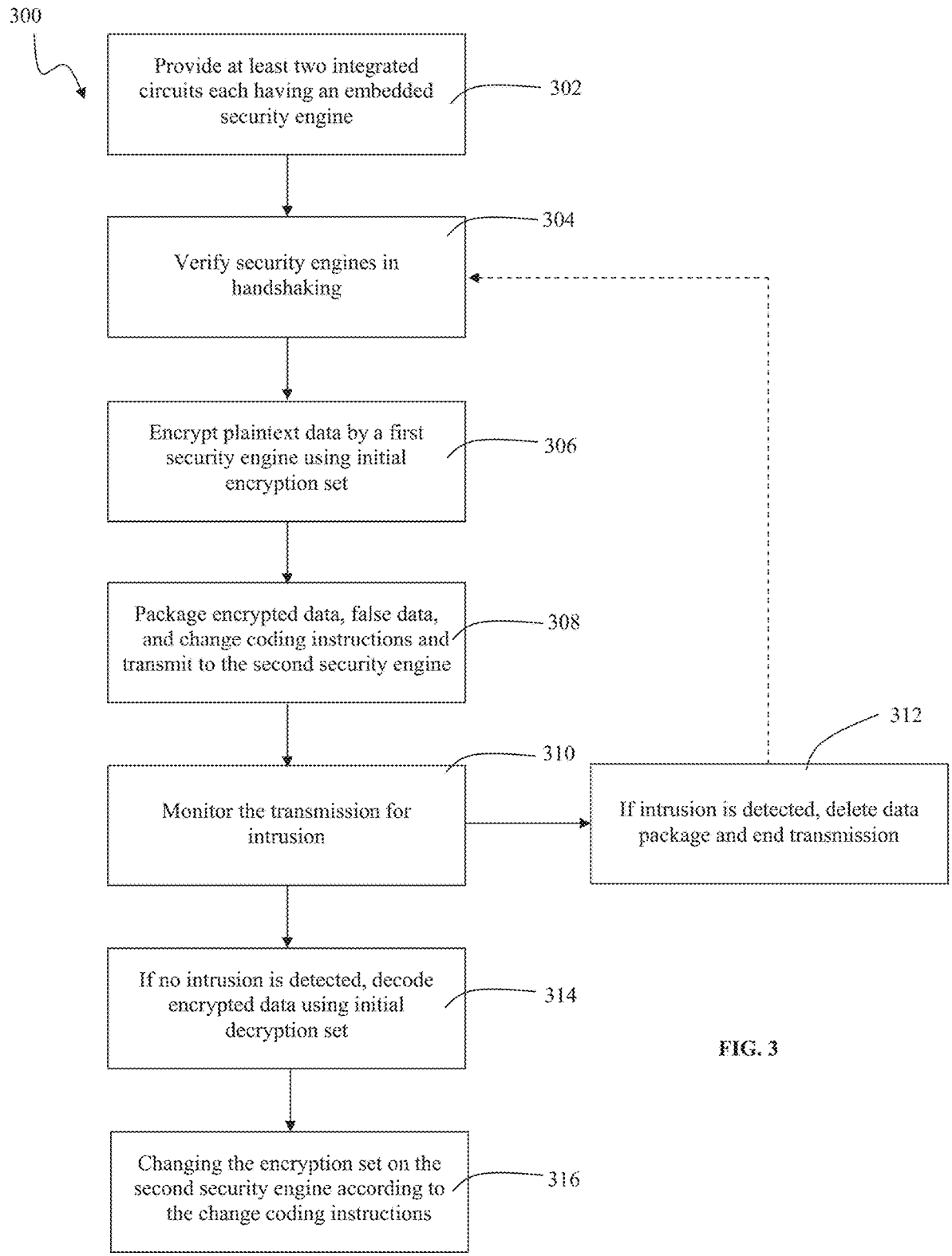
FIG. 3 is a flowchart of a method for securing electronic data, according to an embodiment.

Referring to FIG. 3, a flowchart of a method 300 for securing electronic data is depicted, according to an embodiment.

Method 300 begins at 302. At 302, at least two integrated circuits are provided. In an embodiment, each integrated circuit comprises an embedded security engine. For example, the integrated circuits can comprise integrated circuit 104 as depicted in FIG. 1. The integrated circuits can be provided by manufacture of the silicon wafer and embedding of the security engine during manufacture. In an embodiment, integrated circuits can be provided by operably coupling the integrated circuits' corresponding electronic device to a network or other communication system.

At 304, handshaking between the two integrated circuits is conducted. During the handshaking, each of the integrated circuits and particularly, each of the security engines, can interface to the other. In an embodiment, a first security engine can verify the private key of a second security engine. Likewise, the second security engine can verify the private key of the first security engine. In embodiments, the ID or device identifier are confirmed or verified by the respective security engines Multiple configuration options can be coordinated or exchanged during handshaking. For example, one option is a number of cycles at which the keys will be changed. For example, the default setting may be "1," wherein the encrypted content is sent immediately after handshaking and the keys are subsequently changed. However, changing the number of cycles to "2" allows for an additional transmission back from a second device to the initiating first device (or yet another "empty" transmission from the initiating device to the second device, in another embodiment), after which the encrypted plaintext can then be sent. Embodiments therefore allow for changing of the point at which the transmission package containing the encrypted content is sent. This provides an additional layer of security, as anyone monitoring the transmissions will not know at what point the desired encrypted text is sent.

At 306, plaintext data is encrypted by a first security engine. In an embodiment, the plaintext data can be subjected to a random number generator in combination with the shared private key to generate the encrypted content.

At 308, the encrypted output from 306 is wrapped with false data, packaged with key change coding instructions, and transmitted to a second security engine. In an embodiment, the false data is encrypted with the same random number as the real plaintext data in 306. The packaged data can be transmitted along any network line or other vulnerable conveyance system or interface. In an embodiment, upon transmission, the key change coding instructions are deleted on the first security engine.

At 310, the transmission package is monitored for intrusion. For example, an intrusion detection engine of the second security engine can monitor the incoming package for intrusion, malicious activities, or policy violations, as appropriate. In other embodiments, the intrusion detection engines of both first and second security engines can collaborate to detect intrusion.

At 312, if intrusion is detected, the data package is considered to be unsecured. An error can be output and transmitted back to the first security engine. The data package is deleted and transmission is subsequently ended. Optionally, method 300 can return to 304 to restart initial handshaking in order to retry the transmission.

At 314, if no intrusion is detected, the encrypted data package is decoded by the second security engine using the preexisting shared key. For example, in the instant case of first transmission, the initial decryption set is utilized using the initial shared key.

At 316, the shared key is changed on the second security engine according to the received key change coding instructions. Notably, the shared key is never transmitted by either device, thus increasing security over protocols that require such transmission. Rather, only instructions to change the initial shared key are transmitted, which maintains secrecy of the shared key. Additional security can be provided at the initial key change event. For example, the initial key change event can take place in the secure originating factory. As a result, once the keys are changed, it is unnecessary to safeguard the values of the original keys, as the original keys have no value in decoding current transmissions.

Figure 4A:
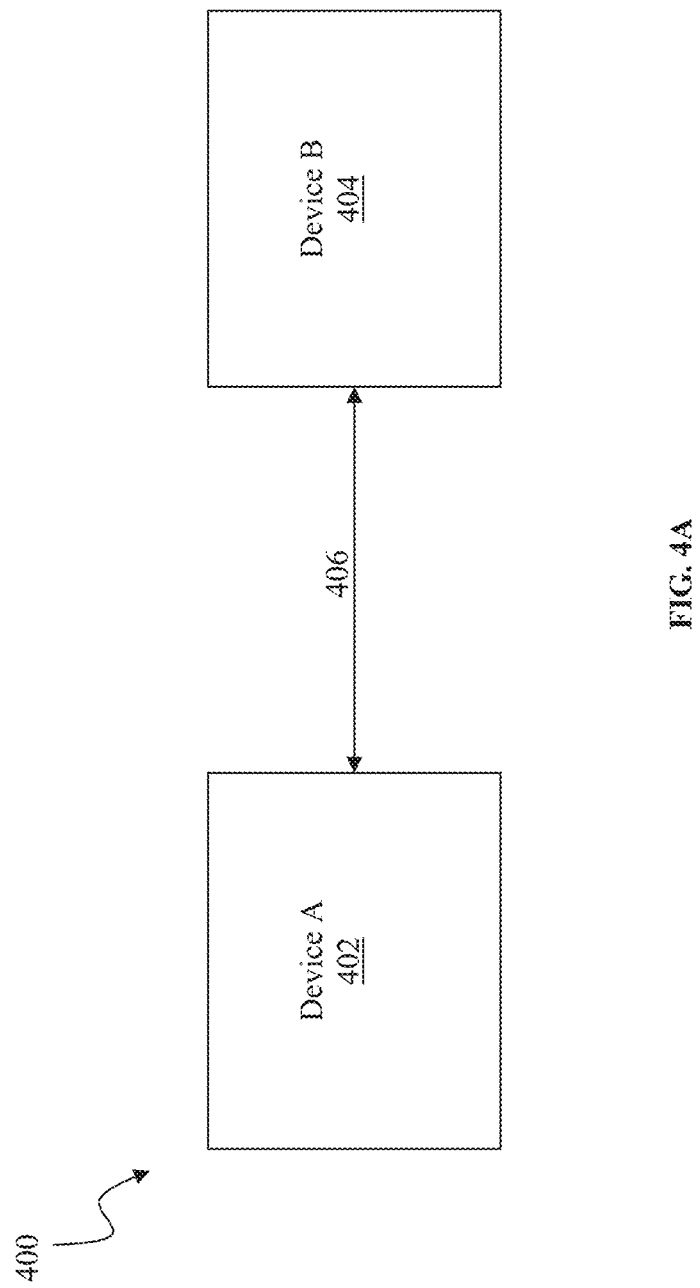
FIG. 4A is a block diagram of a system for securing electronic data, according to an embodiment.

Referring to FIG. 4A, a block diagram of a system 400 for securing electronic data is depicted, according to an embodiment. System 400 generally comprises a first device, Device A 402 and a second device, Device B 404. In embodiments, devices 402 and 404 are substantially similar to electronic device 100 and each comprise an integrated circuit having an embedded security engine similar to integrated circuit 104 and security engine 106. A communication interface 406 operably couples Device A 402 and Device B 404. System 400 therefore depicts a device-to-device architecture wherein the private key pairs reside within respective devices 402 and 404.

Figure 4B:
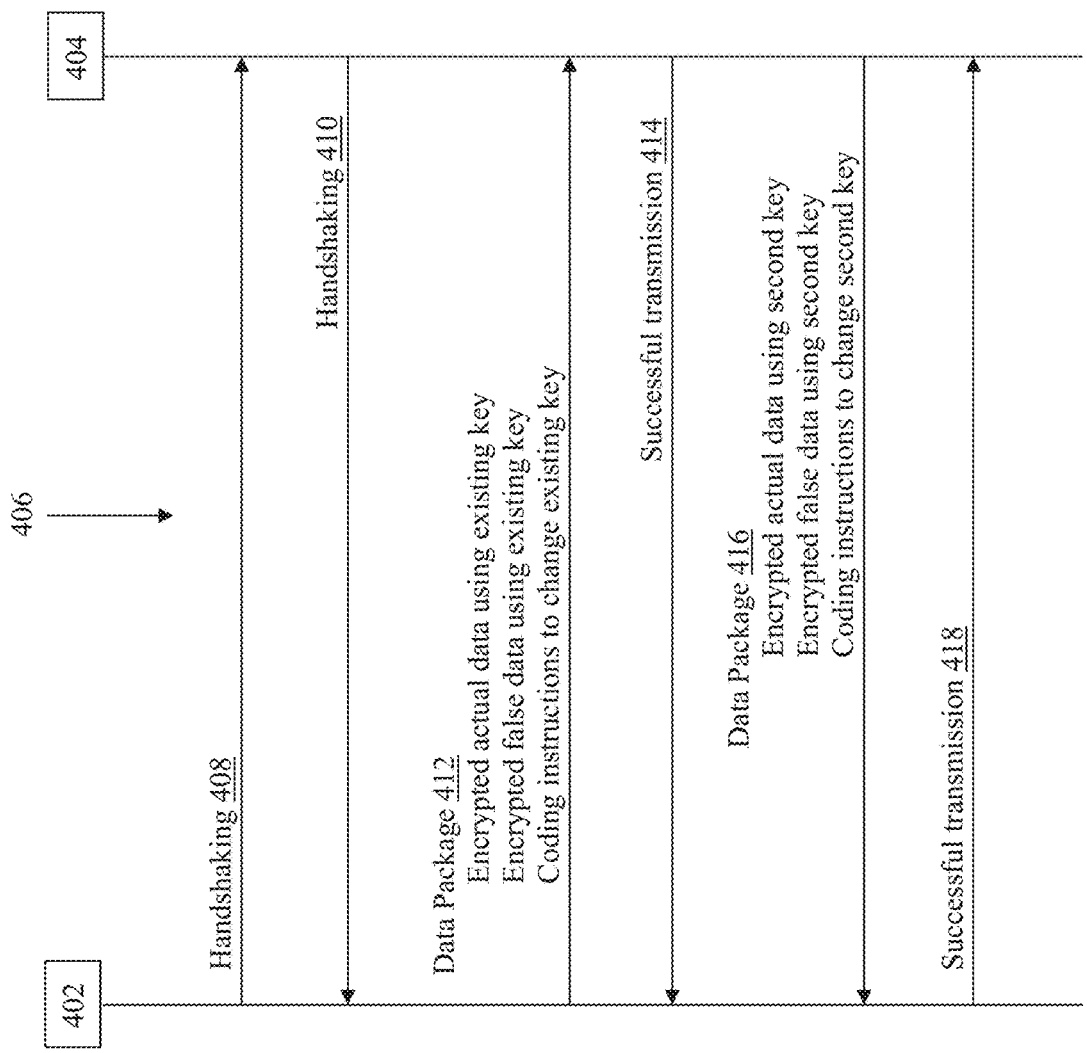
FIG. 4B is a block diagram of a transmission sequence for the system of FIG. 4A, according to an embodiment.

Referring to FIG. 4B, a block diagram of a transmission sequence along communication interface 406 for system 400 is depicted, according to an embodiment. Device A 402 and Device B 404 are depicted on opposite ends of FIG. 4B.

Communication between devices 402 and 404 is conducted over communication interface 406. In an embodiment, devices 402 and 404 can communicate through the Internet or other network, or in a proprietary connection. For example, in a proprietary connection, Device A 402 may be directly connected to Device B 404.

Device A 402 initiates communication with handshaking 408. As described with respect to method 300, Device A 402 can verify the private or shared key of Device B 404. Device B 404 can likewise verify the private or shared key of Device A 402 with handshaking 410. Although each of handshakings 408 and 410 are depicted respectfully as a single transmission and receipt, handshakings 408 and 410 can comprise multiple transmissions and receptions. In an embodiment, handshaking 408 comprises a request for the ID (or other suitable verification parameter of the private key) of Device B 404. In such embodiments, handshaking 410 comprises a transmission of the ID of Device B 404.

Once sufficiently configured and verified according to handshaking 408 and handshaking 410, Device A 402 can package in a transmission package 412 actual data encrypted using the existing private key, false data encrypted using the existing private key, and key change coding instructions to change the private key on Device B 404. Transmission package 412 is then sent to Device B 404. It should be noted that the key change coding instructions can likewise be encrypted prior to transmission, in embodiments. However, encrypting the key change coding instructions is not necessary due to the secrecy of the shared private keys. Without knowledge of the private key, the change instructions themselves are meaningless with respect to decoding intercepted data.

Device B 404 receives transmission package 412 from Device A 402. As described in method 300, Device B 404 monitors the transmission for intrusion and decodes transmission package 412 using its existing key. Subsequently, the existing key change coding instructions are simultaneously rewritten and replaced by the new key change coding instructions (for example, by code overwrite engine 214). A success indication 414 can be transmitted back to Device A 402.

Continuing the example of FIG. 4B, for a subsequent substantive data transmission, Device B 404 can package in a transmission package 416 actual data encrypted using the second (changed) private key, false data encrypted using the second private key, and key change coding instructions to change the private key on Device A 402. Transmission package 416 is then sent to Device A 402.

Device A 402 receives transmission package 416 from Device B 404. As described in method 300, Device A 402 monitors the transmission for intrusion and decodes transmission package 416 using the second private key. A success indication 418 can be transmitted back to Device B 404.

Figure 4C:
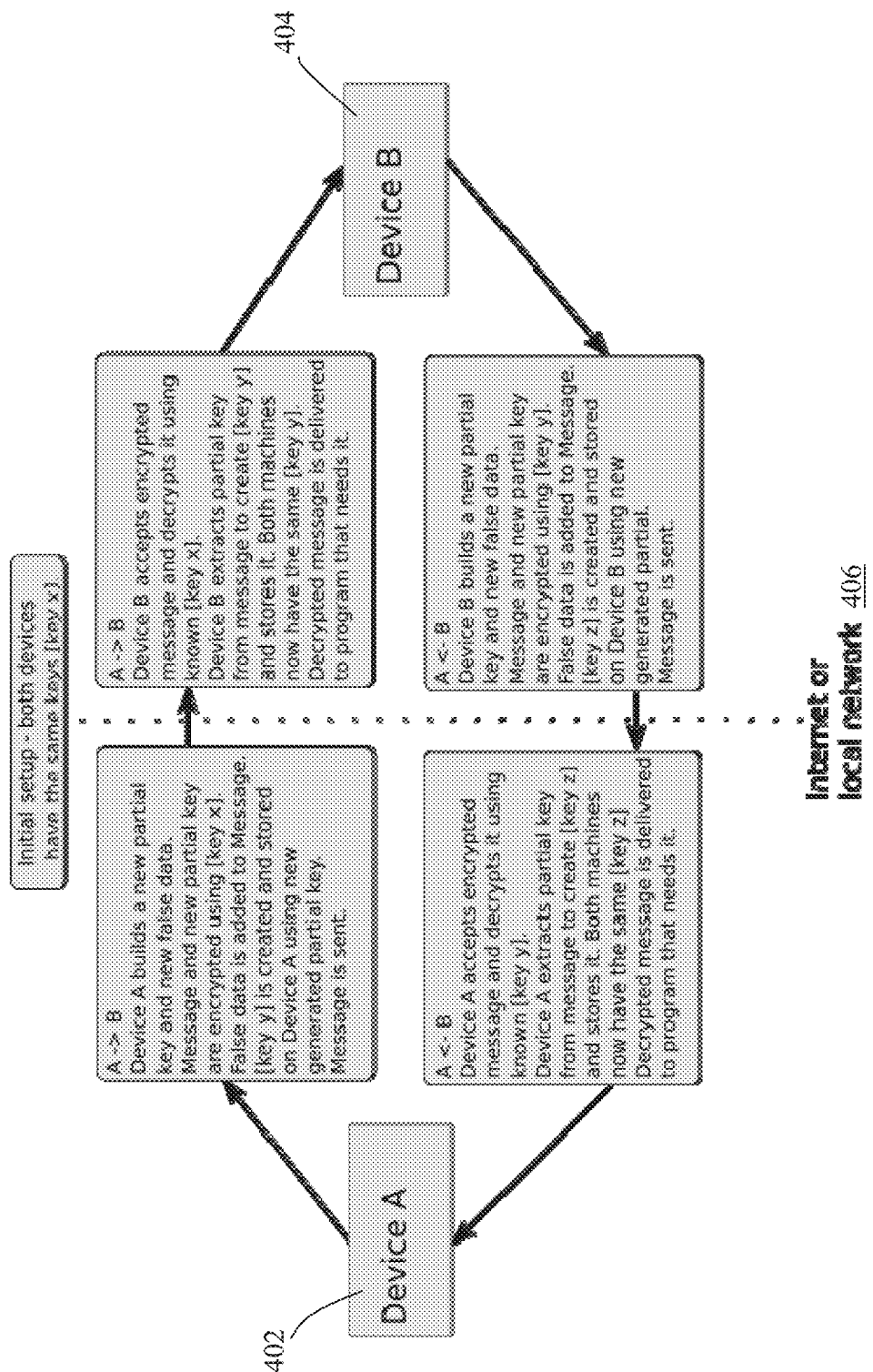
FIG. 4C is a block diagram of a transmission sequence for the system of FIG. 4A, according to an embodiment.

Referring to FIG. 4C, a block diagram of a transmission sequence for system 400 is depicted in additional detail, according to an embodiment. In the embodiment depicted, communication interface 406 comprises the Internet or local network, and devices 402 and 404 have the same initial key x. In FIG. 4C, reference to the "partial key" is interchangeable with "key change coding instructions." One skilled in the art will readily appreciate that the partial key in this context comprises change instructions to change the existing key.

Figure 5A:
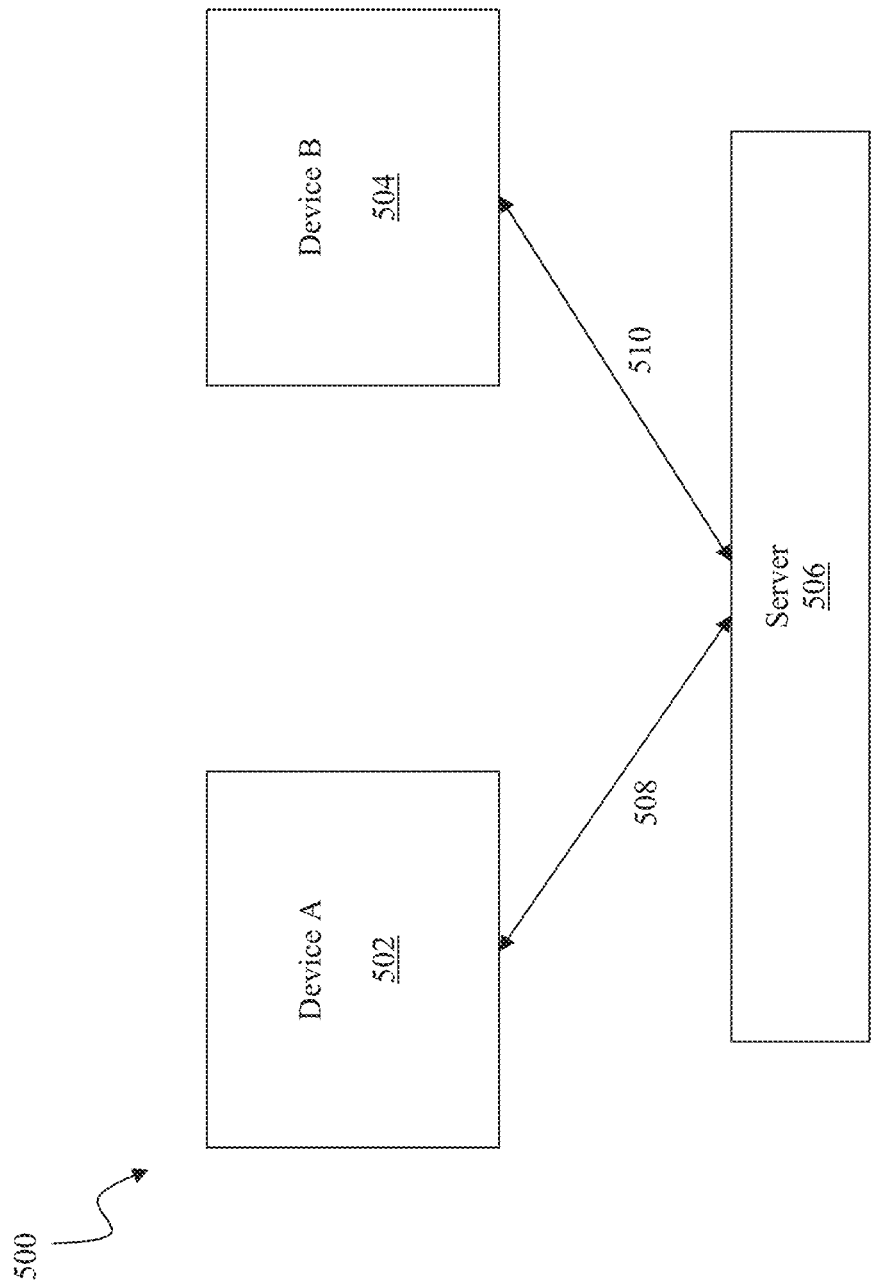
FIG. 5A is a block diagram of a system for securing electronic data utilizing an intermediate server, according to an embodiment.

Referring to FIG. 5A, a block diagram of a system 500 for securing electronic data utilizing an intermediate server is depicted, according to an embodiment. System 500 generally comprises a first device, Device A 502, a second device, Device B 504, and an intermediary server 506.

In embodiments, devices 502 and 504 are substantially similar to electronic device 100 and each comprise an integrated circuit having an embedded security engine similar to integrated circuit 104 and security engine 106.

In embodiments, intermediary server 506 can comprise a computing device configured as a server. In other embodiments, intermediary server 506 can comprise a router or other networked hardware.

A first communication interface 508 operably couples Device A 502 to intermediary server 506 and a second communication interface 510 operably couples Device B 504 to intermediary server 506.

System 500 depicts an intermediary server architecture wherein the private key pairs reside on both the devices and the intermediary server. System 500 allows for a supervisory user to have access to each of the key pairs of the individual devices. For example, appropriate authorities can "unlock" data on a device by use of the appropriate private key on the intermediary server that corresponds to a particular device.

Referring to FIG. 5B, a block diagram of a transmission sequence along communication interfaces 508 and 510 for system 500 is depicted, according to an embodiment. Device A 502 and Device B 504 are depicted on opposite ends of FIG. 5B, with intermediary server 506 positioned in between. Communication between devices 502 and 504 is conducted over communication interface 508 and 510 via intermediary server 506. In embodiments, intermediary server 506 can store any or all of the communication requests or data transmitted between devices 502 and 504.

As depicted, Device A 502 initiates handshaking 512. A handshaking 512 request is transmitted over 508 to intermediary server 506. Intermediary server 506 relays the request over 510 via handshaking 514 request to Device B 504. Although Device A 502 is depicted as initiating handshaking 512, it is understood that intermediate server 506 can initiate handshaking 512.

Device B 504 replies to handshaking request 514 via handshaking 516. For example, handshaking 514 can include a request for the ID (or other suitable verification parameter of the private key) of Device B 504. In such embodiments, handshaking 516 comprises a transmission of the ID of Device B 504. Intermediary server 506 receives handshaking 516 and forwards on an appropriate handshaking response 518 to Device A 502.

Once sufficiently configured and verified according to handshakings 512-518, Device A 502 can package in a transmission package 520 actual data encrypted using the existing private key, false data encrypted using the existing private key, and key change coding instructions to change the private key on Device B 504. Transmission package 520 is then sent to intermediary server 506.

Transmission package 520 is repackaged or forwarded as data package 522 from intermediary server 506 to Device B 504. Device B 504 receives transmission package 522 from intermediary server 506. As described in method 300, Device B 504 monitors the transmission for intrusion and decodes transmission package 522 using the existing private key. Subsequently, the existing key change coding instructions are simultaneously rewritten and replaced by the new key change coding instructions (for example, by code overwrite engine 214).

A success indication 524 can be transmitted back to intermediary server 506. Intermediary server 506 can likewise repackage or forward success indication 524 as success indication 526 to Device A 502.

In an embodiment, devices 502 and 504 need not "know" that they are interfacing with intermediary server 506, as the communications respectively appear to each device as though they are communicating in a device-to-device architecture. However, in other embodiments, communications to and from devices 502 and 504 are tailored for communication with intermediary server 506.

Figure 5C:
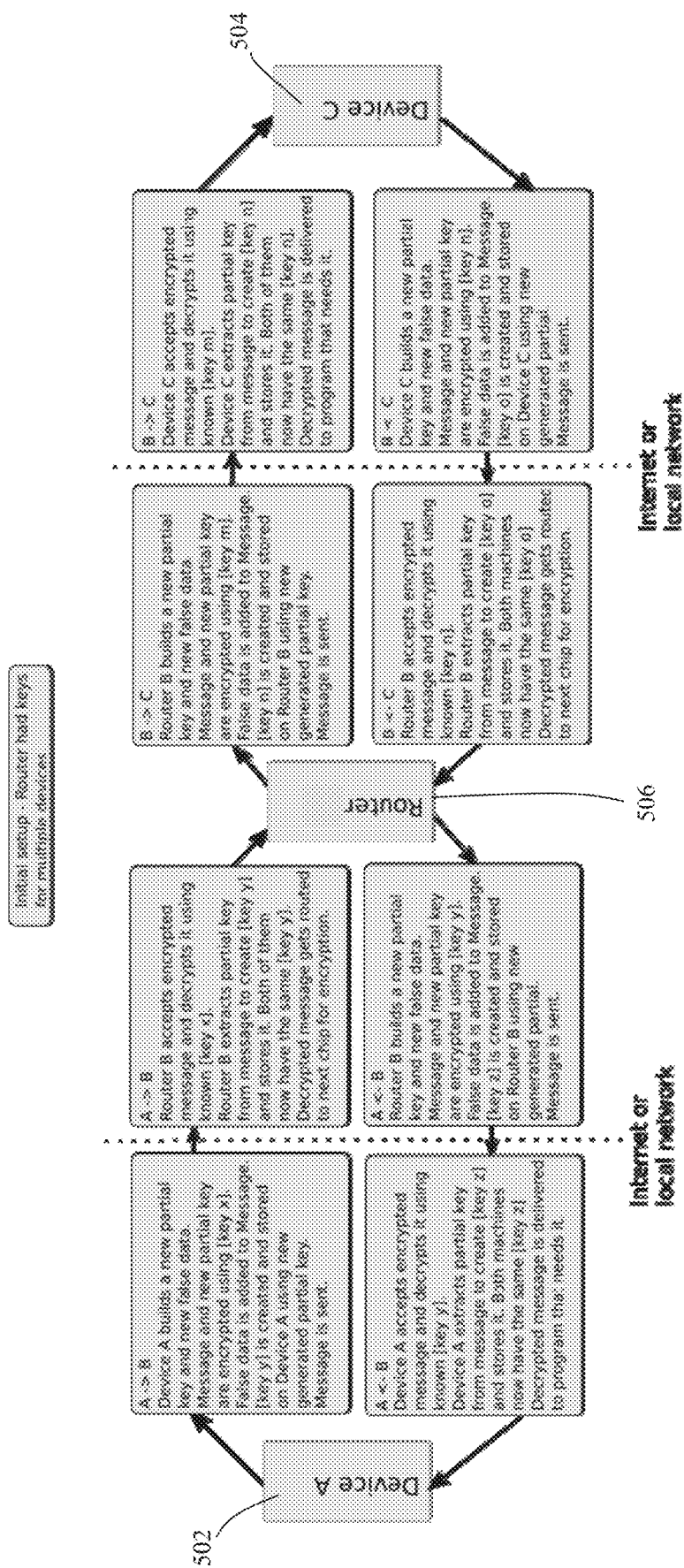
FIG. 5C is a block diagram of a transmission sequence for the system of FIG. 5A, according to an embodiment.

Referring to FIG. 5C, a block diagram of a transmission sequence for system 500 is depicted in additional detail, according to an embodiment. In FIG. 5C, reference to the "partial key" is interchangeable with "key change coding instructions." One skilled in the art will readily appreciate that the partial key in this context comprises change instructions to change the existing key.

In the embodiment depicted, the intermediary server comprises a router 506. In the initial setup, router 506 comprises the keys for devices 502 and 504. In another embodiment (not pictured), three or more devices can be in secure communication using the methods described herein. For example, because router 506 that has the paired keys for several devices, a single router can decrypt from a sender, route, encrypt for a receiver, and send individual messages. In such embodiments, the messages are not stored on router 506 in any form. This scheme allows for many-to-many connections.

Additional possible use cases can utilize an intermediate device, such as intermediary server 506 or router 506 for regulatory or other business considerations. The illustrated examples assume the need for the highest level of data security.

Referring to FIG. 6A, a block diagram of a system 600 for securing electronic data at rest utilizing a peripheral device is depicted, according to an embodiment. One skilled in the art will appreciate that the system and methods described herein are applicable not only to data transmissions such as those depicted in FIGS. 4A and 5A, but data at rest, such as FIG. 6A. For example, systems can access and protect a remote data store. In embodiments, all data including the actual data requests could be encrypted, stored and accessed. To secure data at rest, an artificial loop can be created to simulate the architecture used in the aforementioned transmission security.

System 600 generally comprises a data storage device 602 and a peripheral device 604. Data storage device 604 comprises any suitable electronic device configured with an integrated circuit having a security engine and data storage on which data can be stored.

Peripheral device 604 comprises any suitable electronic device configured with an integrated circuit having a security engine. In an embodiment, peripheral device 604 can be a desktop computer, laptop computer, smartphone, tablet, watch, or other suitable electronic device. In an embodiment, peripheral device 604 can comprise a networked server.

A communication interface 606 operably couples data storage device 602 and peripheral device 604. An "artificial" loop is thus created by peripheral device 604 and data storage device 602 over communication interface 606. The loop is "artificial" in that the two devices do not need to be coupled for any functionality of the respective devices. However, once operably coupled, data storage device 602 and peripheral device 604 can utilize the security mechanisms of their respective security engines as described herein. For example, system 600 can operate similar to system 400 in FIG. 4A.

Figure 6B:
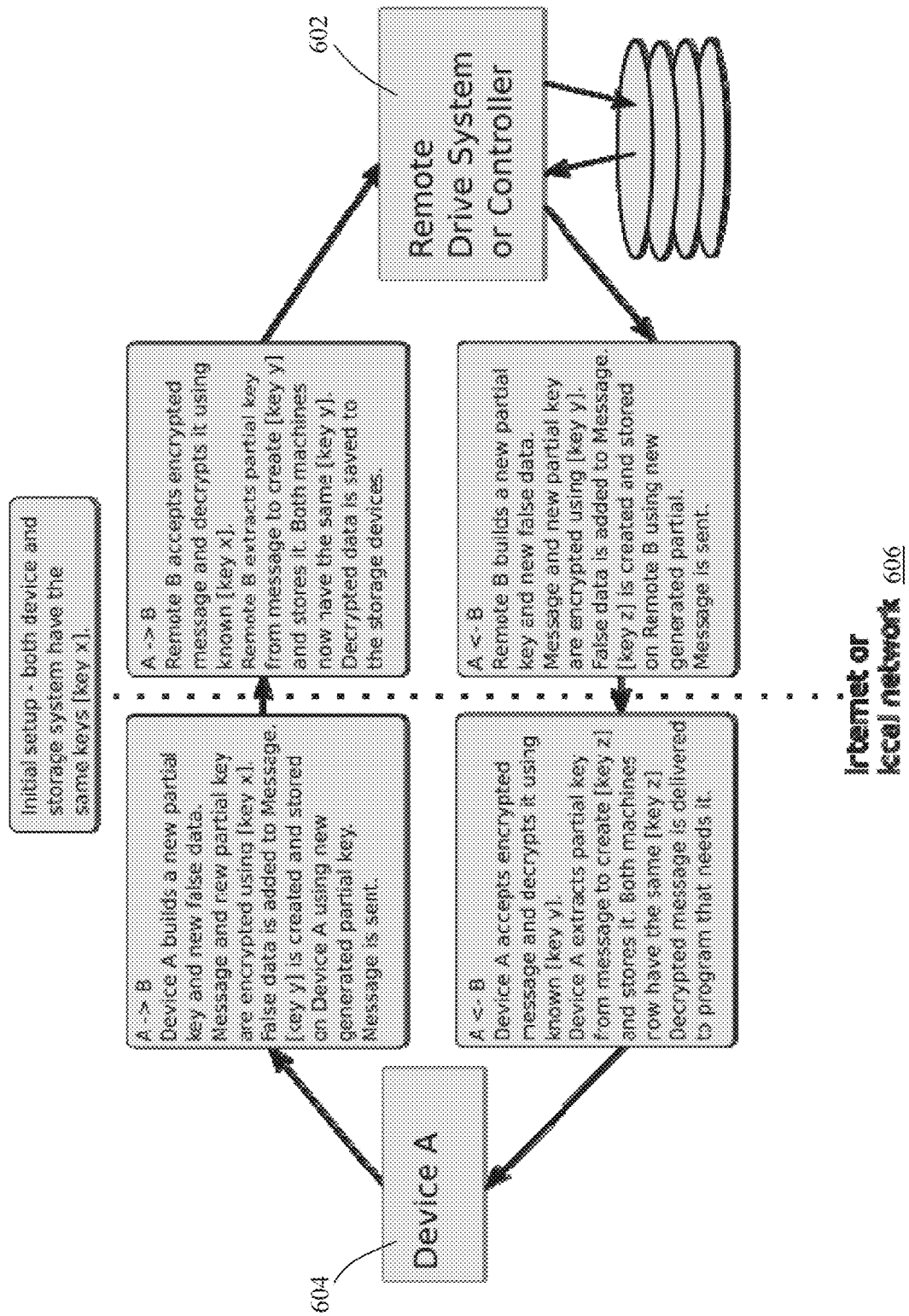
FIG. 6B is a block diagram of a transmission sequence for the system of FIG. 6A, according to an embodiment.

Referring to FIG. 6B, a block diagram of a transmission sequence for system 600 is depicted in additional detail, according to an embodiment. In FIG. 6B, reference to the "partial key" is interchangeable with "key change coding instructions." One skilled in the art will readily appreciate that the partial key in this context comprises change instructions to change the existing key. In the embodiment depicted, communication interface 606 comprises the Internet or local network, and both data storage device 602 and peripheral device 604 and 404 have the same initial key x.

In an embodiment, the methods described herein can be used to encrypt all content stored on data storage device 602. In another embodiment, the methods described herein can be used to encrypt the access keys to data storage device 602, thus securing the content stored on data storage device 602. Myriad variations in the level of security can be implemented once the loop of two integrated circuits is created. For example, by a similar architecture and method, any device could be protected; a flash drive with a chip paired either with a chip in the device, or a chip in another device, or in an intermediate device, in order to achieve stored data security or a direct device to device secured channel.

In certain embodiments, systems and methods can be utilized to secure electronic devices utilizing a software-based solution. It will be understood, however, that there are numerous detailed ways of implementing the arrangement, relationship, and processing flow beyond the specifics of the exemplary embodiment that are contemplated by the present disclosure and in accordance with the various embodiments described herein.

Figure 7:
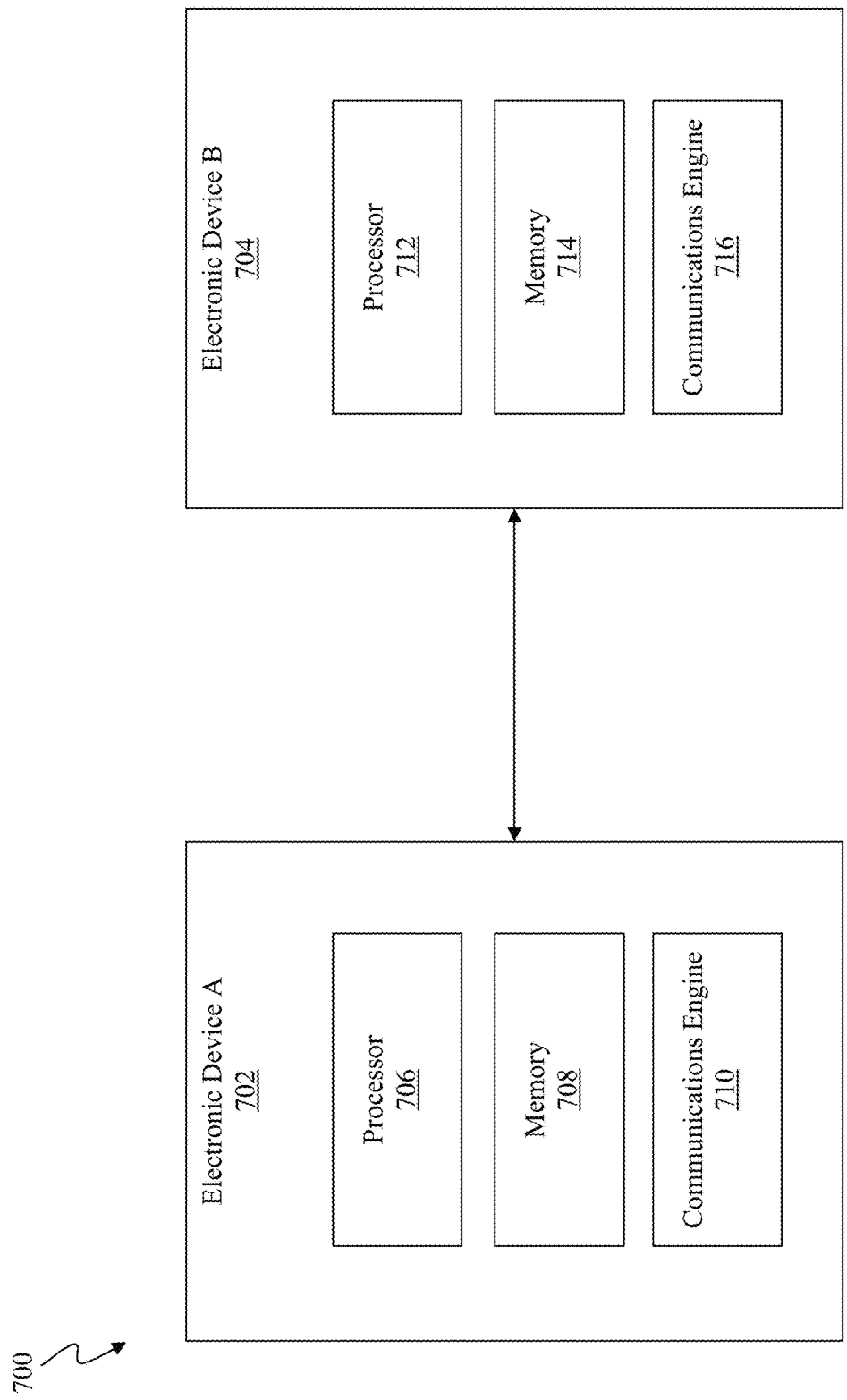
FIG. 7 is a block diagram of a system for securing electronic data in a peer-to-peer transfer system, according to an embodiment.

For example, referring to FIG. 7, a block diagram of a system 700 for securing electronic data in a peer-to-peer transfer system is depicted, according to an embodiment. System 700 generally comprises a first device Electronic Device A 702 operably coupled to a second Electronic Device B 704.

Electronic Device A 702 comprises a processor 706, a memory 708, and a communications engine 710.

Processor 706 can be configured with program instructions to implement the particular functionality of the secured transfer communications in combination with operably coupled memory 708.

Communications engine 710 is configured to transmit and receive data related to the encryption and decryption of messages between Electronic Device A 702 and Electronic Device B 704. In embodiments, communications engine 710 can comprise communications software and transceiver circuitry. Transmitter circuitry can comprise one or more electronic elements configured to transmit and receive data related to system 700. For example, wireless transceiver circuitry can be configured for radio frequency (RF) communications, WIFI communications, BLUETOOTH communications, cellular communications, or near-field communications (NFC). Wired transceiver circuitries can likewise be utilized, such as CAT-5 and CAT-6.

Similarly, Electronic Device B 704 comprises a processor 712 substantially similar to processor 706, a memory 714 substantially similar to memory 708, and a communications engine 716 substantially similar to communications engine 710.

In an embodiment, two web applications executing on separate servers represents Electronic Device A 702 and Electronic Device B 704. The user interfacing component of the web application, as will be shown in the screenshots described below, represents the user application with access to Electronic Device A 702 or Electronic Device B 704.

Figure 8:
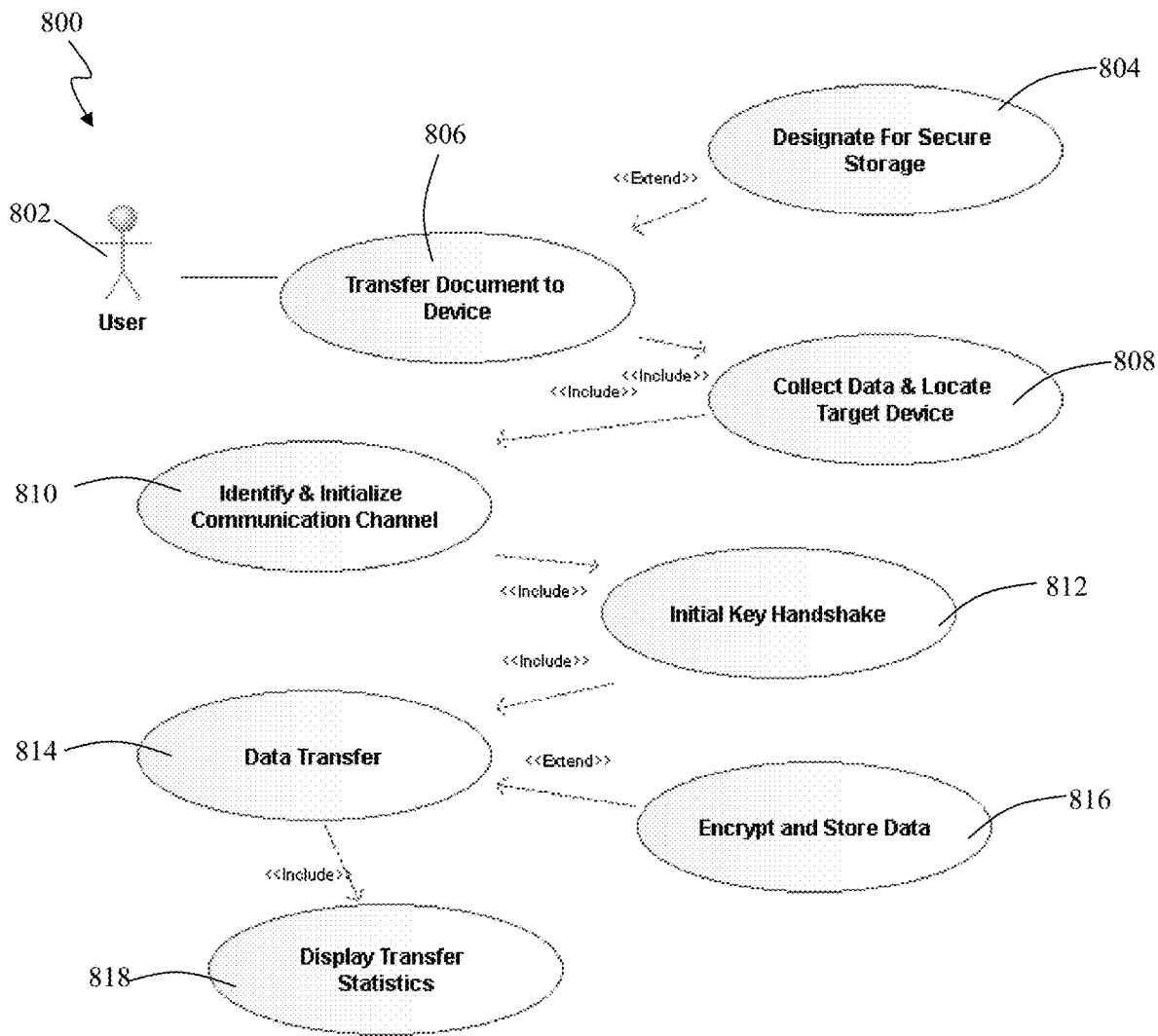
FIG. 8 is a flowchart of a method for securing electronic data in the peer-to-peer transfer system of FIG. 7, according to an embodiment.

FIG. 8 is a flowchart of a method 800 for securing electronic data in the peer-to-peer transfer system of FIG. 7 for one or more users 802, according to an embodiment. In an embodiment, method 800 operates generally with two electronic devices having access to the same symmetric key. Reference to Electronic Device A 702 and Electronic Device B 704 will be made in describing FIG. 8 for ease of explanation.

At 804, a user operating an electronic device can designate a document for secure storage. For example, the sending user 802 can indicate that the receiving device (Electronic Device B 704) should store the message in its data at rest storage vault instead of an unencrypted output directory, once received.

At 806, user 802 conducts an initial transfer of the document to be secured to his electronic device. For example, user 802 can download, transfer, communicate, or otherwise install a document on Electronic Device A 702. In an embodiment, communications engine 710 can be utilized to download the document, which can be stored on memory 708.

At 808, the electronic device can be commanded to collect the data to be transferred. In embodiments, the target device can further be specified. For example, user 802 can specify a local device name (and/or address), target device name (and/or address), and file to transmit on Electronic Device A 702. In embodiments, Electronic Device B 704 is the target device.

At 810, the communication channel for secure transfer can be identified and initialized. For example, an address for the target device can be looked up in one or more coupled databases or operably coupled memory, such as memory 708. Communications engine 710 can pass initialization data or request data to corresponding communications engine 716. In an embodiment, receiving or target device Electronic Device B 704 uses communications engine 716 to receive data and further to identify the sending device (here, Electronic Device A 702).

At 812, initial handshaking between the electronic devices is conducted. In embodiments, a sending device can generate a symmetric key for plaintext communication using a codeset of a collection of 32-bit numbers that comprise a unique set to be grabbed during encryption. For example, Electronic Device A 702 can generate a symmetric key, which is transferred to Electronic Device B 704 using the respective communications engines 710 and 716. The handshaking message can include the codeset used to encrypt, decrypt, and how to change the codeset for the next message. Accordingly, a private key generated from the codeset can be stored by each electronic device in device firmware. In further embodiments, false data can further be included in the handshaking message.

At 814, the data is transferred securely using the shared symmetric keys. For example, Electronic Device A 702 grabs codes from its stored codeset, associates a character for each character in transmission, and generates a random operation for the next transmission. The data is thus encrypted by Electronic Device A 702 and transmitted to Electronic Device B 704. Receiving device, Electronic Device B 704, receives the payload and knows where the data is located in the payload based on the handshaking messages (or codeset data, in embodiments). Electronic Device B 704 then device decrypts the payload message to a decrypt output stream and prepares its codeset the same as the sending device (Electronic Device A 702) for the next transmission. In an embodiment, Electronic Device B 704 transmits a confirmation to Electronic Device A 702 to confirm the payload was received and successfully decrypted.

In embodiments, the codeset is changed for subsequent transmissions between Electronic Device A 702 and Electronic Device B 704. For example, a single data file communication can have multiple transmissions or passes. Embodiments ensure that the result for a single pass is unique to the codeset and the next codeset as well. In an example, if a communication has 12 passes, and on the third pass, code "1234" is used, code "1234" will not be used in the fourth pass. In embodiments, unique codes can be used for all 12 passes. In other embodiments, a rule check stipulates that unique codes are used on consecutive transmissions, but the same code can be repeated in subsequent communications or in the same communication on a different pass for a different character.

In another example, a code can be unique for the current transmission and also the next two. In particular, in using 32-bit numbers to represent our code set domain, there are 2 to the 32nd power or 4,294,967,296 possible numbers. A true random number generator can generate unique random numbers from this domain until all numbers were used and then generate a domain set exhausted exception. Using a pseudo random number generator, in most cases the number will be unique, but there may be a chance that a number could be repeated. In order to prevent correlation attacks, embodiments thus verify that a code is not repeated for a transmission pass and an x number of passes after that. This means that there might be a possibility that a code is repeated in the pass (x+1) or the (x+2) pass. Embodiments can therefore check the (x+1) pass and the (x+2) pass for a repeated character. In further embodiments, the character that the code is applied to is also totally random, making it impossible to correlate (as there are 64 characters in the Base64 character set). Embodiments can also provide further obfuscation by randomly choosing an encoding scheme (Base64, Base32, BaseN, . . . ) or no encoding scheme at all. Therefore, what makes correlation impossible is that any existence of a repeated code occurring in a message transmission is a totally random act. For example, say a message takes 88 passes to complete. The transmission may see zero to x number of repeated codes within those 88 passes. Which character these codes point to is totally random.

Embodiments therefore create an absence of correlation in the communication process. The possibility for cryptanalysis of the communications, which typically relies on correlation to create an opportunity for bad actors to intercept and decrypt the messages, is thereby eliminated.

At 816, the received data can be optionally encrypted and stored on the receiving device. For example, Electronic Device B 704 can encrypt the received data using the symmetric key shared between Electronic Device A 702 and Electronic Device B 704, or another encryption key. Embodiments described herein can be used to store the received data in secure data at rest storage.

At 818, transfer statistics can optionally be displayed. For example, Electronic Device A 702 or Electronic Device B 704 can present data related to the secure transfer. User 802 can, for example, view the statistics on Electronic Device A 702 and subsequently return to the "main" user application interface.

In embodiments, the electronic devices can communicate with an intermediate server instead of with each other. For example, Electronic Device A 702 can transmit its message intended for Electronic Device B 704 to an intermediate server. Electronic Device A 702 can be unaware of this intermediary, and instead "think" it is communicating with Electronic Device B 704. Accordingly, the intermediate server can relay or communicate with Electronic Device B 704 to pass the messages intended for Electronic Device B 704 from Electronic Device A 702. Once a message is received from the intermediate server, Electronic Device B 704 can similarly transmit a confirmation or message intended for Electronic Device A 702 to the intermediate server. The intermediate server can relay or communicate with Electronic Device A 702 to pass the messages intended for Electronic Device A 702 from Electronic Device B 704.

In embodiments, the intermediate server can generate the codeset to be used for the encryption between the electronic devices. In embodiments, rules can further be implemented at the intermediate server. For example, a rule can be set at server that "for communication between Electronic Device A 702 and Electronic Device B 704, store a plaintext copy of each transmission to verify what it is." Another process of the intermediate server (or, e.g. a user) can then examine the stored plaintext copy for verification. In other embodiments, other rules can likewise be applied.

Data at rest encryption can be executed for the data stored on intermediate server in a storage vault. For example, a symmetric key and three elements; a known cipher (such as AES), an encrypted codeset including operations for a subsequent transmission, and the data to be stored (as if it were being sent to a different device) are utilized for data-at-rest encryption. Accordingly, the data can be "communicated" (stored) to intermediate server hardware similar to the communication described above with respect to the peer-to-peer transfer of FIGS. 7-8 or the data at rest examples of embodiments described with respect to FIGS. 1-6.

FIGS. 9A-9D are screenshots of web applications executing the method of FIG. 8 for the electronic devices of FIG. 7.

Figure 9A:
FIGS. 9A-9D are screenshots of web applications executing the method of FIG. 8 for the electronic devices of FIG. 7, according to embodiments.

For example, in FIG. 9A, the user of a sending electronic device, such as Electronic Device A 702, can specify a local device name, a target device name, and a file to upload securely to another electronic device, such as Electronic Device B 704. Upon selecting "Browse . . . " and choosing a file, the front component of the web application collects parameters and stores uploaded file in a temporary "holding" directory. The user can then select "Press" to transmit the file.

The transfer can then be initialized, such as at 810, referring again to FIG. 8. At initialization, the local electronic device is looked up by name from the ElectronicDeviceFactory. The DataProvidingApplication is instantiated with arguments: FileInputStream, filename, targetDeviceName, targetDeviceUrl, device. On the local device, the initializeAsSender method is called, which passes the provider as an argument. The local device IOEngine (Communications engine) is initialized with URL information from the provider application. Subsequently, the Provider constructs an initialize URL to the target device and makes a call to setup the transfer. If the returned response is OKAY_200, the receiving device is open for communication.

In an embodiment, a provideSecurely method on the local device can then be called. For example, continuing elements of 810, a Begin Transmission phase, including device identification, can then be entered. A handshaking phase, such as that at 812 can then be conducted as part of the provideSecurely method. Further, the data transfer can then be conducted, such as that at 814. Finally, statistics can be collect and the method can return, such as at 818. In an embodiment, files in the temporary "holding" directory are deleted and statistics are displayed to the user.

Figure 9B:
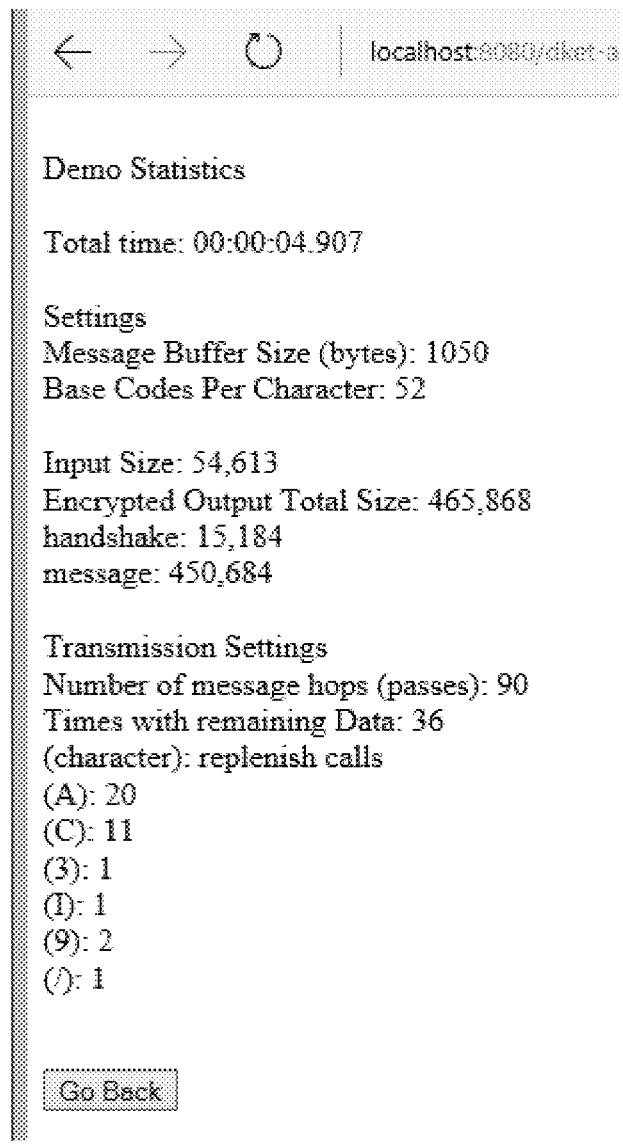

Referring to FIG. 9B, statistics related to the secure transfer can be displayed. For example, Total time is displayed in hours:minutes:seconds.and milliseconds.

Message Buffer Size is displayed as the number of bytes read in from an input stream per pass. In an embodiment, because Base64 characters are utilized, Message Buffer Size should be divisible by 3.

Base Codes per Character is displayed as the minimum number of codes generated for a character. Various other characters are weighted based on use. Note Base Codes per Character is not needed in a read-ahead situation like data at rest, as will be described. Input Size is displayed as the number of bytes in the original file. In embodiments, Message Buffer Size and Base Codes per Character can be tweaked or otherwise varied to change the process for incoming data.

Encrypted Output Total Size is displayed as the total number of bytes transferred to the receiving device.

Handshake is displayed as the number of bytes making up the handshake portion.

Message is displayed as the number of bytes making up the message portion.

Number of Message hops is displayed as the number or request/response passes for the Message phase.

In an embodiment, for a particular pass, if codes for a character are exhausted before the message buffer is filled up, the Remaining Data is handled in the next pass. Times with Remaining Data is thus displayed for the number of times this happened per character.

Figures 9C, 9D:
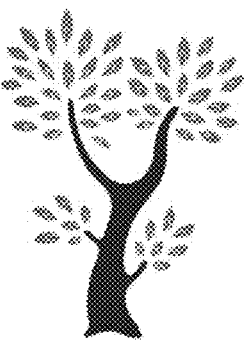

Referring to FIG. 9C, at the receiving device, such as Electronic Device B 704, it can be verified that the document was transmitted successfully. For example a user of Electronic Device B 704 can select to "View Transferred (Received) Files." The picture is subsequently downloaded and displayed, for example, in FIG. 9D.

According to embodiments, Base64 encoding is utilized for software-solution encryption. Because it is desirable to encrypt binary data as well as text data, embodiments utilize Base64 to initially encode the incoming data. The Base64 character set is made up of 64 characters plus a padding character for a total of 65 characters. That is, 65 characters compared to 256 characters using straight binary.

This affects the Message Buffer Size and the Base Codes per Character. The Message Buffer Size should be divisible by three because the Base64 encoding algorithm generates four characters for each three bytes read (a 3/4 ratio). That is, if it is assured that actual data to be encoded and then encrypted represents a byte size where length % (modulus) 3=0, then the padding character (=) will only need to be used in the last pass. So, assigning the CodesPerCharacter for the '=' character with a value of 3 will handle the worst case scenario.

According to embodiments, a dynamic key encryption change set is implemented for software-solution encryption. In an embodiment, a DynamicKeyEncryptionCipher class instantiates a DynamicKeyEncryptionChangeSet object on initialization. The DynamicKeyEncryptionChangeSet keeps track of the codes used, and key changes for the upcoming change set. This change set is used to modify the current Key into the Key for the next pass. During the encryption process, for each code used, a random operation (ChangeSetOperation) is generated to be that code's key change. In an embodiment, the code (key change) generated by the operation is checked for uniqueness against both the existing codeSet and the changeSet collection. This verifies that this code will not be repeated in this pass or the next. Other key change checks can likewise be performed, such as checking for uniqueness against the entire transmission set. Accordingly, code changes can be conducted at any timing interval as well, and not just based on transmission passes.

Solutions described herein can utilize an input stream to the data being encrypted. In other embodiments, solutions described herein can utilize a read-ahead to the data being encrypted. For example, streaming is utilized in the peer-to-peer secure transfer embodiments described herein. Because of the streaming required, a guess can only be made at the proper codes per character and message buffer size. In another example, read-ahead can be used for data at rest embodiments. In such embodiments, because the complete data can be obtained within the device, Base64 encoding stage can analyze the data to have a perfect codes per character value.

Figure 10:
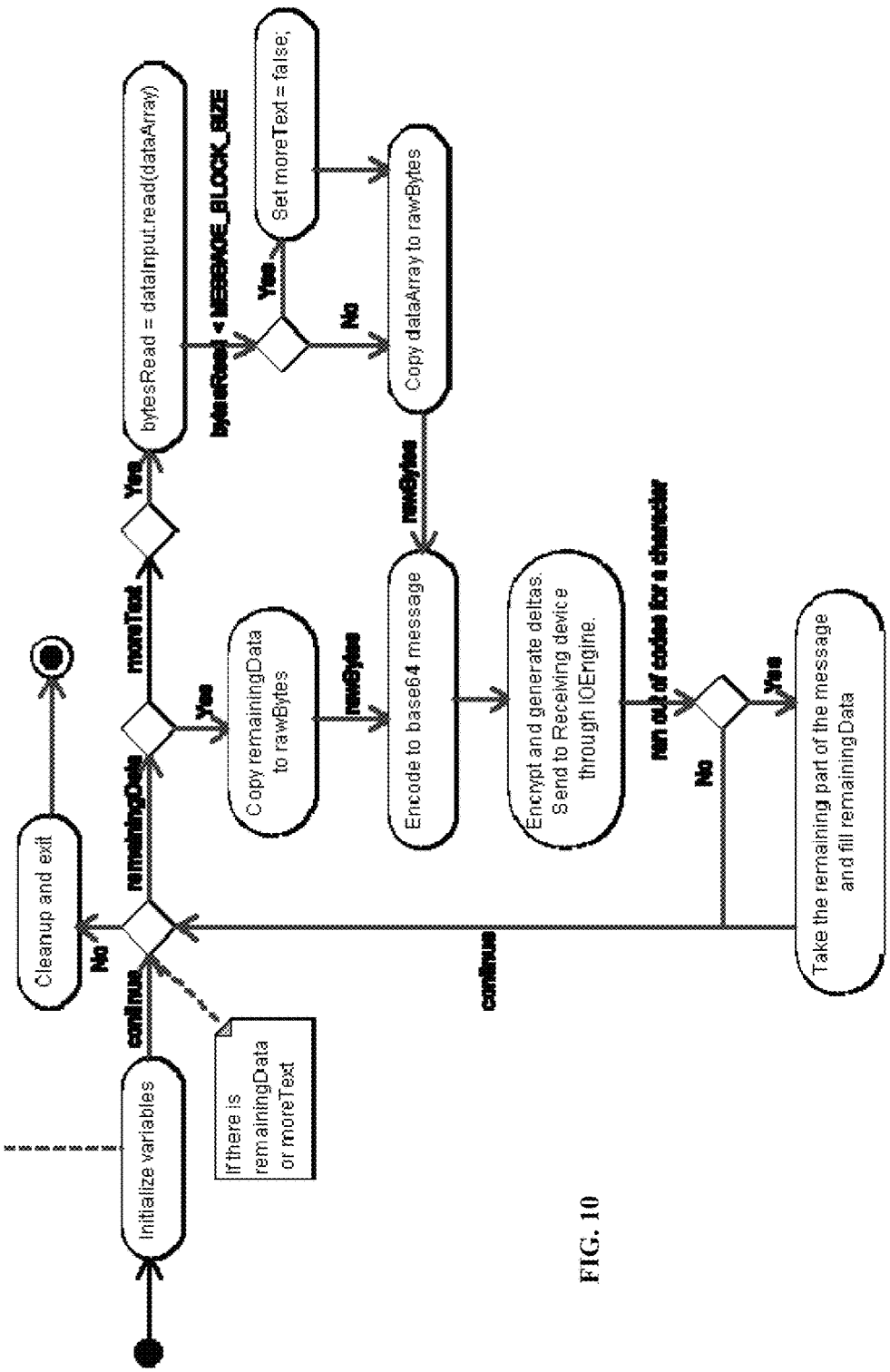
FIG. 10 is a flowchart of a method for encrypting data for an input stream, according to an embodiment.

Turning first to a streaming solution, as mentioned above, a sending electronic device can be presented with an input stream to the data to be encrypted. Accordingly, the sending electronic device does not know the size or the content of the data. As such, the sending electronic device will need to guess an optimum setting for the codes per character and message buffer size. This will be a balancing act. A larger Message Buffer Size will reduce the number of hops (passes) needed to take in transferring the message to the receiving device. However, unless the CodesPerCharacter (and by deduction the total number of codes in the CodeSet) is sufficiently large, encryption in this manner is likely to include a large number of Remaining Data passes. In an embodiment, an encrypt method keeps the encoded message and/or remaining data parts divisible by three. Referring to FIG. 10, a flowchart of a method for encrypting data for an input stream is depicted, according to an embodiment.

Turning next to a read-ahead solution, a sending electronic device can read ahead for the data to be encrypted. In other words, the sending electronic device can read the data to determine the size and the content of the data before generating the initial key for encryption. In an embodiment, the maximum times a character will be used can be calculated. The optimum values for the codesPerCharacter list will be known before the encryption process is started and as such, the codeSet will not include any unnecessary codes. This approach represents the most optimum use of resources.

Data at rest storage embodiments are demonstrated with two scenarios in the web application screen shots. Referring to FIG. 11A, a screenshot of a web application for executing data at rest secure storage for a direct-to-electronic device example, according to an embodiment. The direct-to-electronic device example allows a user to select a file to upload to the local electronic device (represented in FIG. 11A by the web application). In an embodiment, the uploaded file is stored in the 'holding' directory. Once the user presses "Press" to store the file, this "tempFile" is encoded (Base64) into a second file: "base64File". During the subsequent encoding process, the data is analyzed allowing optimum values to be placed in the codesPerCharacter list. After the encryption and storage, the "tempFile" and "base64File" files are deleted.

Referring to FIG. 11B, a screenshot of a web application for executing data at rest secure storage on a receiving device after a data transfer is depicted, according to an embodiment. For example, the sending electronic device user can select "Store document in Target Device's Vault," indicating that the receiving device should store the message in its data at rest storage vault instead of an unencrypted output directory. Referring to FIG. 8, for example at 804, a user can designate a document for secure storage after transfer. In an embodiment, a StorageVaultFileSystem, as an implementation of a DataAtRestStorageVault interface, can store the document as a composite of three files: 'filename.key'—serialized "AES" SecretKey, 'filename.B64.dkeBean'—serialized dke key wrapped as SealedObject by "AES" key, and 'filename.B64.dket'—the encrypted codes representing the actual data.

In a method of peer-to-peer transfer with data at rest storage, referring again to FIG. 11B, the user of a sending device can specify a local device name (and/or address), target device name (and/or address), that the document should be stored in the target device vault, and the document to transmit from the sending device. Upon selecting "Browse . . . " and choosing a file, the front component of the web application collects parameters and stores uploaded file in a temporary "holding" directory. The user can then select "Press" to transmit the file.

The transfer can then be initialized, such as at 810, referring again to FIG. 8. At initialization, the local electronic device is looked up by name from the ElectronicDeviceFactory.

The DataProvidingApplication is instantiated with arguments: FileInputStream, filename, targetDeviceName, targetDeviceUrl, device. On the local device, the initializeAsSender method is called, which passes the provider as an argument. The local device IOEngine (Communications engine) is initialized with URL information from the provider application. Subsequently, the Provider constructs an initialize URL to the target device and makes a call to setup the transfer. If the returned response is OKAY_200, the receiving device is open for communication.

In an embodiment, a provideSecurely method on the local device can then be called. For example, continuing elements of 810, a Begin Transmission phase, including device identification, can then be entered. A handshaking phase, such as that at 812 can then be conducted as part of the provideSecurely method. Further, the data transfer can then be conducted, such as that at 814. Finally, statistics can be collect and the method can return, such as at 818. In an embodiment, files in the temporary "holding" directory are deleted and statistics are displayed to the user.

Figure 12:
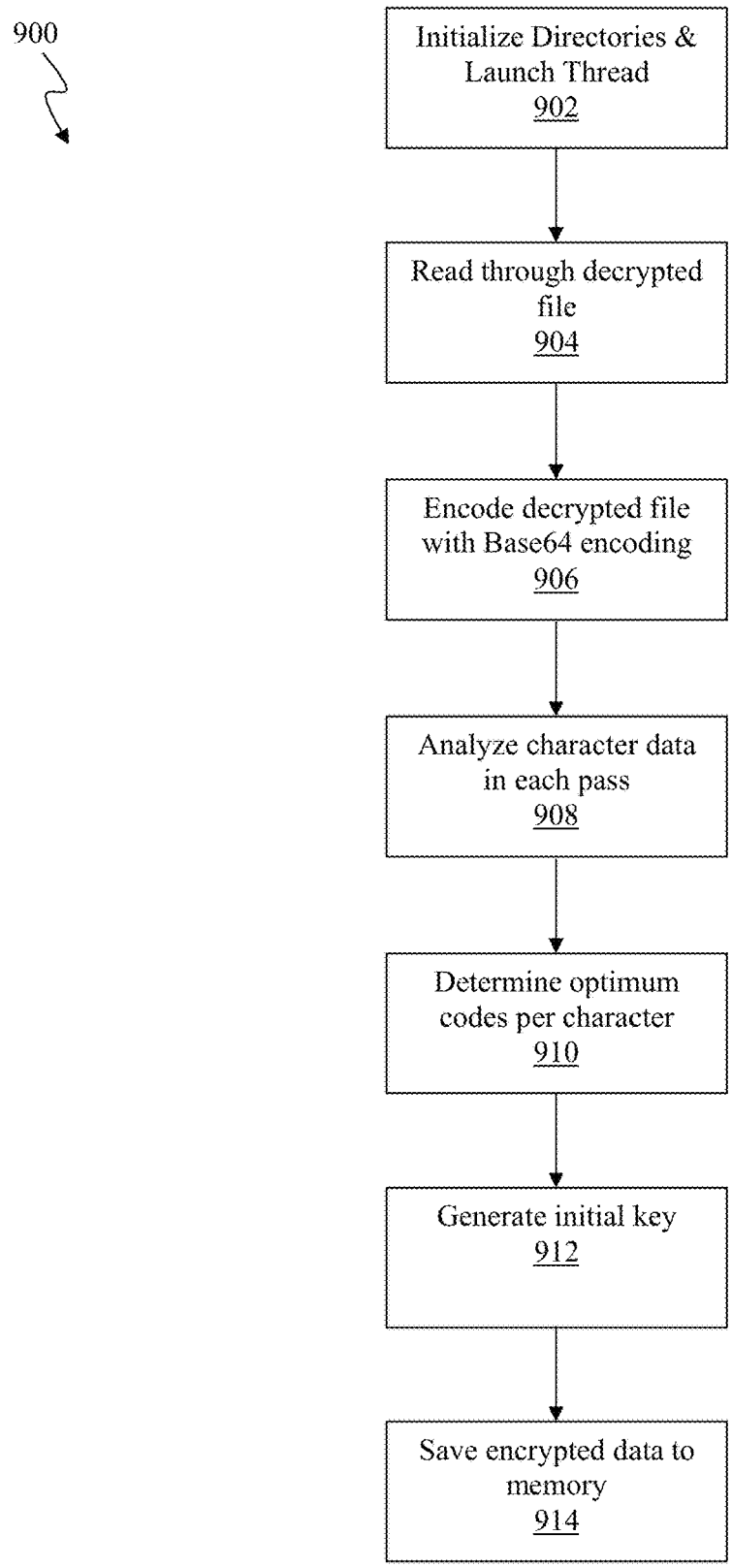
FIG. 12 is a flowchart of a method for securing electronic data at rest utilizing a software solution, according to an embodiment.

Referring to FIG. 12, a flowchart of a method 900 for securing electronic data at rest utilizing a software solution is depicted, according to an embodiment. Method 900 can be executed after receiving a file from the peer-to-peer transfer, such as that of FIG. 8.

At 902, in combination with receiving device initialization, such as that described at 810, the target directory for the decrypted file is set to a "holding" directory instead of an "output" directory. In embodiments, when the transfer has finished in the receiving device, a new thread is launched to handle the data at rest phase, and the main thread returns an "all is okay" message to the sending device.

At 904, the received file is read through. In embodiments, as described herein, the received file is unencrypted from the transfer and decoding process. In an embodiment, the input stream is stored in a "tempFile."

At 906, the data from tempFile is encoded using Base64 and stored in a second file. In an embodiment, the second file is called "base64File."

Concurrently or serially, at 908, the character data being used in each pass is analyzed.

At 910, the optimum values for the codesPerCharacter list can then be determined before the encryption process.

At 912, once the DataAtRestStorageBean has been initialized with the optimum codes per character and the "base64File" has been created, an initial key is generated.

At 914, the encryption can be conducted and the encrypted data can be stored to memory. For example, a storeDataAtRest( ) method can be called in the electronic device. In embodiments, the codeset can be changed for subsequent encryption "passes" similar to those described herein with respect to peer-to-peer transmissions. In an embodiment, the "tempFile" and "base64File" can then be deleted from the "holding" directory.

According to embodiments, dynamic key encryption can utilize non-repeating embodiments based on dynamic randomness, obfuscation, and three interdependent collections:
List<Character>supportedCharacters;
List<Integer>codesPerCharacter; and
Set<Integer>codeSet.

The supportedCharacters list is initialized with the 65 characters used in the common Base64 character set. In a streaming input data scenario, the codesPerCharacter list is initialized with the baseCodesPerCharacter variable. After initialization, a "weighting" (increasing the value) of certain characters is applied. In an embodiment, the weighting is statically applied.

However, in further embodiments, the weighting can be based on an analysis of the type of data a device is configured to handle. In an embodiment, different weighting maps are utilized, based on the type of data coming in to the device. For example, some binary files have a tendency to have large areas of zeroed out data. In Base64, three zeros will generate four upper case 'A's (00 00 00->AAAA). Therefore, in an embodiment, upon reading the file at 904 or otherwise determining the type of file a particular mimetype or other characteristic of the data can be incorporated into a weighting algorithm. In an embodiment, certain characters cause a large number of replenish calls. In embodiments, as certain coding is conducted, algorithms can "learn" which characters are used more often than other characters and accordingly change the supportedCharacters, codesPerCharacter, and/or codeSet lists.

Finally, the codeSet is filled with X randomly generated 32-bit codes. The number X is determined by adding up all the values in the codesPerCharacter list.

In embodiments, key change coding instructions can be aided by the adding codes to each list. In embodiments, the lists can be seeded with three randomly generated indexes for each operation.

When sending the encrypted message, each 32-bit encryption code (representing a character) is followed by a 16-bit operation lookup code. The corresponding operation for the index can be applied to this code for the next key instance. Also, when the key collections are passed to the receiving device during the handshake, all of the codes in the codeSet are modified by a randomly generated operation (an index of which is included). The receiver then applies the inverse operation to the codes before use. In this way, the actual codes are never passed over the wire prior to use.

In an embodiment, prior to passing the ChangeSetOperation, supportedCharaters, codesPerCharacter, and codeSet to the receiving device during the handshake phase, the collections and data types are serialized and encrypted using an existing symmetric cipher such as "AES". Both devices will have local access to the same symmetric key for serialization.

The three collections plus a delegate class (for example, TwoWayCharacterCodeSetMap) that maintains and utilizes the data to perform the encryption and decryption operations, all reside in the DynamicKeyEncryptionBean class. The instance for this matrixBean is kept with the DynamicKeyEncryptionGenerator class.

In a peer-to-peer single message scenario (from sending device to receiving device), the matrixBean can be used by the sending device to encrypt and the receiving device to decrypt the single message. However, in a peer-to-peer dialog scenario, as will be described in FIG. 13, a second matrixBean will be instantiated, initialized and maintained in the DynamicKeyEncryptionGenerator class. The local instantiation is used for encryption and the remote instantiation will be used for decryption.

Figure 13:
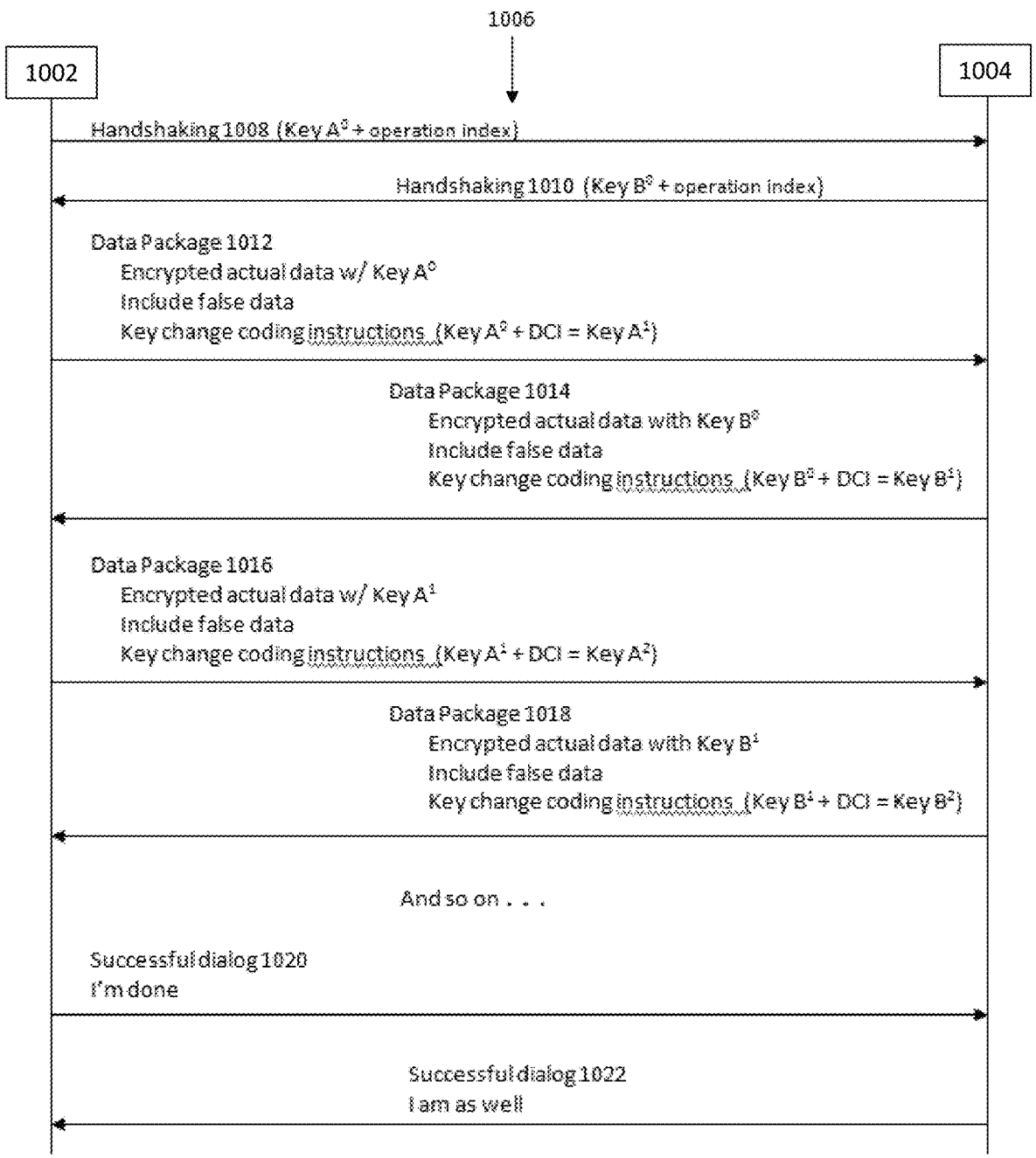
FIG. 13 is a block diagram of a transmission sequence for a peer-to-peer dialogue, according to an embodiment.

For example, in the peer-to-peer embodiments described herein, a single message is shared from Device A to Device B (with confirmations, in certain embodiments). However, in another embodiment, a "dialogue" can be conducted between Device A and Device B. Referring to FIG. 13, a block diagram of a transmission sequence for a peer-to-peer dialogue is depicted, according to an embodiment.

As depicted, Device A 1002 is participating in a dialog 706 with Device B 1004. Since actual message data is going in both directions, two keys are used. One (Key $A^X$) is managed by Device A 1002 and received by Device B 1004. The other (Key $B^X$) is managed by Device B 1004 and received by Device A 1002.

During Handshake 1008, Device A 1002 passes the initial Key $A^0$, stored as its local matrixBean, to Device B 1004 which stores the initial Key $A^0$ as its remote matrixBean. Device B 1004 responds with handshake 1010 by passing its initial Key $B^0$, as its local matrixBean, to Device A 1002 which stores Key $B^0$ as its remote matrixBean.

The first Data Package 1012, sent from Device A 1002 to Device B 1004, can include encrypted actual data using Key $A^0$, false data, and key change coding instructions (DCI). Key $A^1$ is created by applying DCI to $A^0$. Device B 1004 receives the package, decrypts the actual data (using remote Key $A^0$), ignores the false data and applies the DCI to $A^0$ to create $A^1$ as the next remote Key. The response to this message is sent by Device B 1004 to Device A 1002 in Data Package 1014. This package will include encrypted actual data using Key $B^0$, false data, and key change coding instructions. Key $B^1$ is created by applying DCI to $B^0$. Device A 1002 receives the package, decrypts the actual data (using remote Key $B^0$), ignores the false data and applies the DCI to $B^0$ to create $B^1$ as the next remote Key.

This process can continue with data packages 1016 and 1018 and so on until the parties identify that they are done at 1020 and 1022. Normal cleanup can be conducted in Device A 1002 and Device B 1004 as memory buffers and other temporary storage can be zeroed out and keys destroyed.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for securing an electronic data transmission between a sending electronic device and a receiving electronic device, the system comprising:
    a sending electronic device including a processor, an operably coupled memory, and a communications engine interfaced with the processor;
    the memory further comprising instructions that, when executed, causes the sending electronic device to implement:
        selecting a first subset of codes from a codeset to generate a symmetric key, wherein the codeset is a collection of numbers,
        identifying a receiving electronic device configured to receive an electronic data transmission,
        handshaking with the receiving electronic device using the communications engine, wherein the handshaking includes transmitting the codeset and key change coding instructions from the sending electronic device to the receiving electronic device,
        encrypting a portion of the data using the first subset of codes and transmitting, using the communications engine, the encrypted portion of the data to the receiving electronic device,
        changing the symmetric key for a subsequent transmission pass by selecting a second subset of codes from the codeset that is different from the first subset of codes using the key change coding instructions, and
        applying a checking rule to the first subset of codes and the second subset of codes, the checking rule defining a number of transmission passes for which subsequent subsets of codes must be distinctive.

2. The system for securing an electronic data transmission of claim 1, wherein the memory further comprises instructions that, when executed, causes the sending electronic device to implement: encrypting a second portion of the data using the second subset of codes and transmitting, using the communications engine, the encrypted second portion of the data to the receiving electronic device.

3. The system for securing an electronic data transmission of claim 1, wherein the memory further comprises instructions that, when executed, causes the sending electronic device to implement: receiving, using the communications engine, a confirmation of successful transmission of the encrypted portion of the data from the receiving electronic device.

4. The system for securing an electronic data transmission of claim 1, wherein the collection of numbers is a set of randomly-generated 32-bit codes.

5. The system for securing an electronic data transmission of claim 1, wherein the memory further comprises instructions that, when executed, causes the sending electronic device to implement: encoding the data with a Base64 encoding prior to encrypting the data.

6. The system for securing an electronic data transmission of claim 5, wherein the size of the data being encoded has a byte size defined by length modulo 3=0.

7. The system for securing an electronic data transmission of claim 5, wherein the data is presented to the sending electronic device in an input stream, and wherein the number of codes in the codeset is based on a codes per character value initially set to 65.

8. The system for securing an electronic data transmission of claim 7, wherein the codes per character are weighted based on a type of the data.

9. The system for securing an electronic data transmission of claim 7, wherein if codes for a character are exhausted prior to filling a message buffer, the remaining data is transmitted in a subsequent pass.

10. A method for securing an electronic data transmission between a sending electronic device and a receiving electronic device, the method comprising:
    selecting a first subset of codes from a codeset to generate a symmetric key, wherein the codeset is a collection of numbers,
    identifying a receiving electronic device configured to receive an electronic data transmission,
    handshaking with the receiving electronic device, wherein the handshaking includes transmitting the codeset and key change coding instructions from the sending electronic device to the receiving electronic device,
    encrypting a portion of the data using the first subset of codes and transmitting the encrypted portion of the data to the receiving electronic device,
    changing the symmetric key for a subsequent transmission pass by selecting a second subset of codes from the codeset that is different from the first subset of codes using the key change coding instructions, and
    applying a checking rule to the first subset of codes and the second subset of codes, the checking rule defining a number of transmission passes for which subsequent subsets of codes must be distinctive.

11. The method for securing an electronic data transmission of claim 10, further comprising:
    encrypting a second portion of the data using the second subset of codes and transmitting the encrypted second portion of the data to the receiving electronic device.

12. The method for securing an electronic data transmission of claim 10, further comprising
    receiving a confirmation of successful transmission of the encrypted portion of the data from the receiving electronic device.

13. The method for securing an electronic data transmission of claim 10, wherein the collection of numbers is a set of randomly-generated 32-bit codes.

14. The method for securing an electronic data transmission of claim 10, further comprising encoding the data with a Base64 encoding prior to encrypting the data.

15. The method for securing an electronic data transmission of claim 14, wherein the size of the data being encoded has a byte size defined by length modulo 3=0.

16. The method for securing an electronic data transmission of claim 14, wherein the data is presented to the sending electronic device in an input stream, and wherein the number of codes in the codeset is based on a codes per character value initially set to 65.

17. The method for securing an electronic data transmission of claim 16, wherein the codes per character are weighted based on a type of the data.

18. The method for securing an electronic data transmission of claim 16, wherein if codes for a character are exhausted prior to filling a message buffer, the remaining data is transmitted in a subsequent pass.

* * * * *